(12) United States Patent
Nyirenda

(10) Patent No.: US 12,367,790 B2
(45) Date of Patent: Jul. 22, 2025

(54) UNIVERSAL METHOD FOR DYNAMIC INTENTS WITH ACCURATE SIGN LANGUAGE OUTPUT IN USER INTERFACES OF APPLICATION PROGRAMS AND OPERATING SYSTEMS

(71) Applicant: USEITWORKS LLC, Gilbert, AZ (US)

(72) Inventor: Paulos James Nyirenda, Gilbert, AZ (US)

(73) Assignee: UseItWorks LLC, Highlands Ranch, CO (US)

( * ) Notice: Subject to any disclaimer, the term of this patent is extended or adjusted under 35 U.S.C. 154(b) by 0 days.

(21) Appl. No.: 17/986,890

(22) Filed: Nov. 14, 2022

(65) Prior Publication Data
US 2024/0242626 A1    Jul. 18, 2024

Related U.S. Application Data

(60) Provisional application No. 63/289,146, filed on Dec. 14, 2021.

(51) Int. Cl.
| | |
|---|---|
| *G09B 21/00* | (2006.01) |
| *G06F 40/242* | (2020.01) |
| *G06F 40/253* | (2020.01) |
| *G06F 40/35* | (2020.01) |
| *G06F 40/58* | (2020.01) |

(52) U.S. Cl.
CPC ......... *G09B 21/009* (2013.01); *G06F 40/242* (2020.01); *G06F 40/253* (2020.01); *G06F 40/35* (2020.01); *G06F 40/58* (2020.01)

(58) Field of Classification Search
CPC ....... G09B 21/00; G09B 21/009; G06F 40/24; G06F 40/25; G06F 40/35; G06F 40/58; G06F 40/242; G06F 40/253
See application file for complete search history.

(56) References Cited

U.S. PATENT DOCUMENTS

| | | | |
|---|---|---|---|
| 2008/0072143 A1* | 3/2008 | Assadollahi | G06F 3/0236 715/261 |
| 2010/0174558 A1* | 7/2010 | Smith | G06Q 10/00 709/219 |
| 2012/0036137 A1* | 2/2012 | Naidu | G06F 16/3326 707/E17.084 |
| 2016/0147741 A1* | 5/2016 | Dawar | G09B 21/009 715/703 |

\* cited by examiner

*Primary Examiner* — Timothy A Musselman
(74) *Attorney, Agent, or Firm* — IPTechLaw

(57) ABSTRACT

A system and method for producing intents for both operating systems and software application programs in service provider computing systems, extended with sign language support, are disclosed. An intent represents an action that, when executed by a computing system, may fulfill a user's request or goal. According to the present subject matter, an intent is a preferred extension to predefined commands as well as application programming interfaces (APIs) to integrate natural language processing (NLP) both in operating systems and software application programs. An intent is concept-driven and domain-independent, and facilitates user collaboration in natural language while providing an inclusive actionable insights framework capable of support that also provides for users with communication challenges not limited to the auditory-impaired or deaf.

26 Claims, 14 Drawing Sheets

| 41 INPUT WORD | 42 INTENT WORD | 43 PART OF SPEECH | 44 (INTENT WORD) MEANING | 45 COMMAND WORD | 46 POSITION IN COMMAND | 47 MISSING WORDS | 48 EXCESS WORDS |
|---|---|---|---|---|---|---|---|
| "SHOW" | "DISPLAY" | VERB | ... | "DISPLAYS" | 0 | PROTOCOL, STATISTICS, CURRENT, TCP, IP, ALL, PORTS, CONNECTIONS, LISTENING | |
| "ME" | <UNDEFINED> | <UNDEFINED> | <UNDEFINED> | <UNDEFINED> | <UNDEFINED> | | |
| "NETWORK" | "NETWORK" | NOUN | ... | "NETWORK" | 6 | | |
| "CONNECTIONS" | "CONNECTIONS" | NOUN | ... | "CONNECTIONS" | 7 | | |

| 51 WORD | 43 PART OF SPEECH | 52 SUBJECTS |
|---|---|---|
| CONNECTION | ... | ... |
| CONNECTIONS | ... | ... |
| DISPLAY | ... | ... |
| LISTENING | ... | ... |
| ... | ... | ... |
| NETWORK | ... | ... |
| STATISTICS | ... | ... |
| ... | ... | ... |

Figure 5

| 46 POSITION IN COMMAND | 62 CONCEPT | |
|---|---|---|
| 7 | "CONNECTIONS" | ~603 |
| 6 | "NETWORK" | ~602 |
| 0 | "DISPLAY" | ~601 |

Figure 6

| 71 COMMAND NAME | 53 SUBJECT | 73 COMMAND OPTION | 74 INTENT NAME | 75 INTENT MESSAGE | 76 ADDITIONAL INSIGHT INFORMATION (TEXT, IMAGES, SIGN LANGUAGE, VIDEO, ...) |
|---|---|---|---|---|---|
| "NETSTAT" | "NETWORKS" | OPTION "-a" | "NETSTAT_A" | "DISPLAY PROTOCOL STATISTICS AND CURRENT TCP/IP NETWORK CONNECTIONS: ALL CONNECTIONS AND LISTENING PORTS" | |
| | "NETWORKS" | OPTION "-b" | "NETSTAT_B" | "DISPLAY PROTOCOL STATISTICS AND CURRENT TCP/IP NETWORK CONNECTIONS: EXECUTABLES INVOLVED IN CREATING EACH CONNECTION OR LISTENING PORT" | IN SOME CASES WELL-KNOWN EXECUTABLES HOST MULTIPLE INDEPENDENT COMPONENTS, AND IN THESE CASES THE SEQUENCE OF COMPONENTS INVOLVED IN CREATING THE CONNECTION OR LISTENING PORT IS DISPLAYED. IN THIS CASE THE EXECUTABLE NAME IS IN [] AT THE BOTTOM, ON TOP IS THE COMPONENT IT CALLED, AND SO FORTH UNTIL TCP/IP WAS REACHED. NOTE THAT THIS OPTION CAN BE TIME-CONSUMING AND WILL FAIL UNLESS YOU HAVE SUFFICIENT PERMISSIONS |
| | "NETWORKS" | OPTION "-e" | "NETSTAT_E" | "DISPLAY PROTOCOL STATISTICS AND CURRENT TCP/IP NETWORK CONNECTIONS: ETHERNET STATISTICS" | THIS MAY BE COMBINED WITH INTENT "NETSTAT_S" USING "INTENT_ES" |
| | "NETWORKS" | OPTION "-s" | "NETSTAT_S" | "DISPLAY PROTOCOL STATISTICS AND CURRENT TCP/IP NETWORK CONNECTIONS: PER PROTOCOL STATISTICS" | BY DEFAULT, STATISTICS ARE SHOWN FOR IP, IPv6, ICMP, ICMPv6, TCP, TCPv6, UDP, AND UDPv6 |
| | ... | ... | ... | ... | ... |

Figure 7

| 81 WORD | 43 PART OF SPEECH | 82 MEANING | 83 FAMILY |
|---|---|---|---|
| CONNECTION | | | NETSTAT |
| DISPLAY | | | ... |
| LISTENING | | | ... |
| NETWORK | | | ... |
| PROTOCOL | | | ... |
| STATISTICS | | | |
| 53 SUBJECT | | NETWORKS | |

Figure 8

| 131 RULE | | |
|---|---|---|
| 132 CONDITION OF VALIDITY | 1321 | PART OF SPEECH OF ACTION WORD = VERB |
| | 1322 | PART OF SPEECH OF ACTION SPECIFICATION WORD = NOUN(S) |
| | 1323 | INTENT = BASE STATEMENT; OPTIONS |
| 133 ACTION METHOD | 1331 | GETTER = GET/READ/SELECT/DISPLAY |
| | 1332 | SETTER = CREATE/ADD/INSERT; CHANGE/MODIFY/EDIT/UPDATE; DELETE/REMOVE/CLEAR |

| 141 INTENT | | | | | | |
|---|---|---|---|---|---|---|
| 74 NAME | "NETSTAT_A" | | | | | |
| 53 SUBJECT | "NETWORKS" | | | | | |
| 142 BASE MESSAGE | "DISPLAY PROTOCOL STATISTICS AND CURRENT TCP/IP NETWORK CONNECTIONS" | | | | | |
| 143 OPTIONS MESSAGE | "ALL CONNECTIONS AND LISTENING PORTS" | | | | | |
| 144 DATA TABLE | 41 INPUT WORD | 42 INTENT WORD | 52 PART OF SPEECH | 45 COMMAND WORD | 46 POSITION IN COMMAND | MEANING | 76 INSIGHTS |
| | "SHOW" | "DISPLAY" | VERB | "DISPLAYS" | 0 | | TEXT: "..." PICTURES: <PATH> SIGN LANGUAGE: <PATH> VIDEO: <PATH> AUDIO: <PATH> ... |
| | "NETWORK" | "NETWORK" | NOUN | "NETWORK" | 6 | | |
| | "CONNECTIONS" | "CONNECTIONS" | NOUN | "CONNECTIONS" | 7 | | |
| | | "PROTOCOL" | NOUN | "PROTOCOL" | 1 | | |
| | | "STATISTICS" | NOUN | "STATISTICS" | 2 | | |
| | | "IP" | NOUN | "IP" | 5 | | |
| | | "CURRENT" | NOUN | "CURRENT" | 3 | | |
| | | "PORTS" | NOUN | "PORTS" | 11 | | |
| | | "ALL" | NOUN | "ALL" | 8 | | |
| | | "TCP" | NOUN | "TCP" | 4 | | |
| | | "LISTENING" | NOUN | "LISTENING" | 10 | | |
| | | "CONNECTIONS" | NOUN | "CONNECTIONS" | 9 | | |

| 120 COMMAND/ PROVIDER API | 71 NAME | "NETSTAT" |
|---|---|---|
| | 121 DESCRIPTION | "DISPLAYS PROTOCOL STATISTICS AND CURRENT TCP/IP NETWORK CONNECTIONS: ALL CONNECTIONS AND LISTENING PORTS" |

Figure 14

UNIVERSAL METHOD FOR DYNAMIC INTENTS WITH ACCURATE SIGN LANGUAGE OUTPUT IN USER INTERFACES OF APPLICATION PROGRAMS AND OPERATING SYSTEMS

CROSS REFERENCE TO RELATED APPLICATIONS

This document claims the benefit of the filing date of U.S. Provisional Patent Application 63/289,146, entitled "Universal Method For Dynamic Intents With Accurate Sign Language Output In User Interfaces of Application Programs And Operating Systems" to Nyirenda which was filed on Dec. 14, 2021, the disclosure of which is hereby incorporated entirely herein by reference.

BACKGROUND

1. Technical Field

Aspects of this document relate generally to augmentative application programs and operating systems. More specific implementations involve specialized outputs in user interfaces.

2. Background

Computing systems have been devised to allow for data processing beyond ordinary human capabilities. Computing systems often include microprocessors which are designed to work with various forms of memory to store and process data.

SUMMARY

In one of the embodiments, provided is a domain-independent user companion system and method employing predefined intents stored in an intents database and accessing the intents in real-time within one or more utilities. The method includes providing a user interface for purposes of communication. The method further includes receiving input data from a user. The method further includes notifying a user if a request did not match any of the intents in the intents database. The method further includes retrieving a precise intent on a category or subject of desired communication recognized in the user input data, as the best fit to what the user wants to happen. The method further includes producing a family of similar intents corresponding to a service, or capability, in a computer system based on user preferences. The method further includes retrieving a corresponding service and subject of desired communication from a family of intents, for purposes of fulfilling the user's goal.

In another embodiment, is a computer-implemented method of producing a dynamic intent for access in user interfaces of a computer system. The method generally includes producing actionable insights (e.g., text, graphics, pictures, voice, videos, and sign language) associated with an intent for purposes of clarifying the preferences and meaning of the intent. The method further includes storing commands (e.g., from a computer operating system) and application programming interface (API) services (e.g., from a vendor or third-party service provider) as services, or capabilities, in a services database for purposes of automating intent discovery even in real-time. The method further includes determining, based on a set of user preferences recognized within a user request input data, a family of similar services in a computer system. The computer system can be either an operating system or a software application program on any environment, e.g., desktop, Cloud, web, mobile, mainframe, etc. The method further includes retrieving a service from the services database corresponding to an intent fitting a counterpart service from a computer system. The method further includes providing a group of services which are pertinent to a specified category or subject. The method further includes clarifying a service using actionable insights associated with an intent and specific application domain (industry), such as engineering, financial industry, and so on, aimed at addressing specialized project areas and predefined subject of communication.

In yet another embodiment, a computer-implemented interactive system and methods generally for providing access to a (third-party) service provider computer system for purposes of integrating any service in user companion system and user interface. The method further includes intents wherein each intent is a message with a unique set of preferences as variables unambiguously identifiable with either a command for an operating system, or an API for a software application program. The method further includes receiving, from an intent, a plurality of variables identifiable with a unique command within user companion system. The method further includes receiving, from an intent, a plurality of variables identifiable with a unique API service request within user companion system. The method further involves generating a command with a plurality of variables for a specific service stored on service provider computer system. The method further involves generating an API request message with a plurality of variables for a specific service application stored on a service provider computer system. The method further includes executing a command within a computer system to fulfill the intent goal. The method further includes executing an API service request to fulfill the intent goal. The method further includes displaying the generated intent, its variables, the executed service and outcome in user interface of user companion system for purpose of communication.

Other further embodiments, one or more computer-readable non-transitory media includes a computer-executable program that instructs at least one processor to perform methods for providing communication to users in a user interface integrating user companion system, producing intents for users, and generating an API request message to execute a service application on the service provider computer system, or generating a command to execute an operation within user companion system, or remote on vendor computer system.

2. In the present implementations, an organizational schema, for associating intents with sets of variables on subjects and services, is provided as a frame-based concepts topology. In this form of concepts organization, a frame is a set of messages, which holistically embody semantics mappable to a unique intent describing a specific situation in a specific category. Likewise, an intent comprising several concepts, for example, "Open a file by name", will be associated with a frame including these intent variables, namely: "open", "file", and "name", wherein "open" is a verb, and the nouns "file" and "name" are concepts. For purpose of the present implementations, a frame-based schema is implemented so that a predefined intent, verbs and concepts of the subject within the intent message, and a service definition are associated with a frame. It is allowable for the service in the frame to refer to other services. However, the frame only directly refers one service as the top-level service, which in turn includes references to other low-level services nested within it. Low-level services are accessible only via the top-level service. By way of example, the act of opening a file is a "service" that a computer system helps user to fulfill; guided by the intent variables {open, file, name} of the situation that needs the specification to fulfill the requirements for the service. Upon receiving input data in a user's question, the user companion system may recognize a specification in terms of intent variables. In response, the user companion system may provide a frame instance fitting the question and goal.

Accordingly, the present implementations may be generally embodied in any system having a collection of predefined intents for generation as output, and execution of the corresponding service. For advanced usage, such a system may be extended to include predefined schema for new subject as, and when, desired. In turn, each schema includes an intent with pertinent concepts describing a specific situation, and a corresponding service definition to fulfill the intent goal. Without re-writing the system, user input fitting intent variables may thus be used to produce a set of potential intents for the user to select for output, and to execute the corresponding service. Unlike the traditional methods at the time of writing, this method does not require a user to have advanced knowledge about technology: the system identifies the most suitable service based on the user question and the matching intent selected by the user. This is also how users can ask questions in natural language. The method may be used to control operating systems on a computer with predefined commands, or to manipulate computer software programs through APIs as service capabilities.

BRIEF DESCRIPTION OF THE DRAWINGS

The summary provided above, and the features and methods of the present implementations will be more readily understood from the following detailed description, when considered in conjunction with the drawings in this section. Some implementations are described, as examples only, with reference to the accompanying drawings. The drawings are not necessarily to scale; emphasis instead being placed upon illustrating principles of the implementations.

FIG. 4 is an illustrative data structure of an analysis table according to certain aspects related to the implementations;

FIG. 5 is an illustrative glossary of concepts according to certain aspects related to the present implementations;

FIG. 6 is an illustrative data structure of an analysis stack according to certain aspects related to the present implementations;

FIG. 7 is an illustrative intents dictionary according to certain aspects related to the present implementations;

FIG. 8 is a subject nomenclature according to an illustrative aspect of the implementations;

FIG. 14 is an exemplary representation of the definition of an intent-frame according to an aspect of the implementation;

DESCRIPTION

Figure 1:
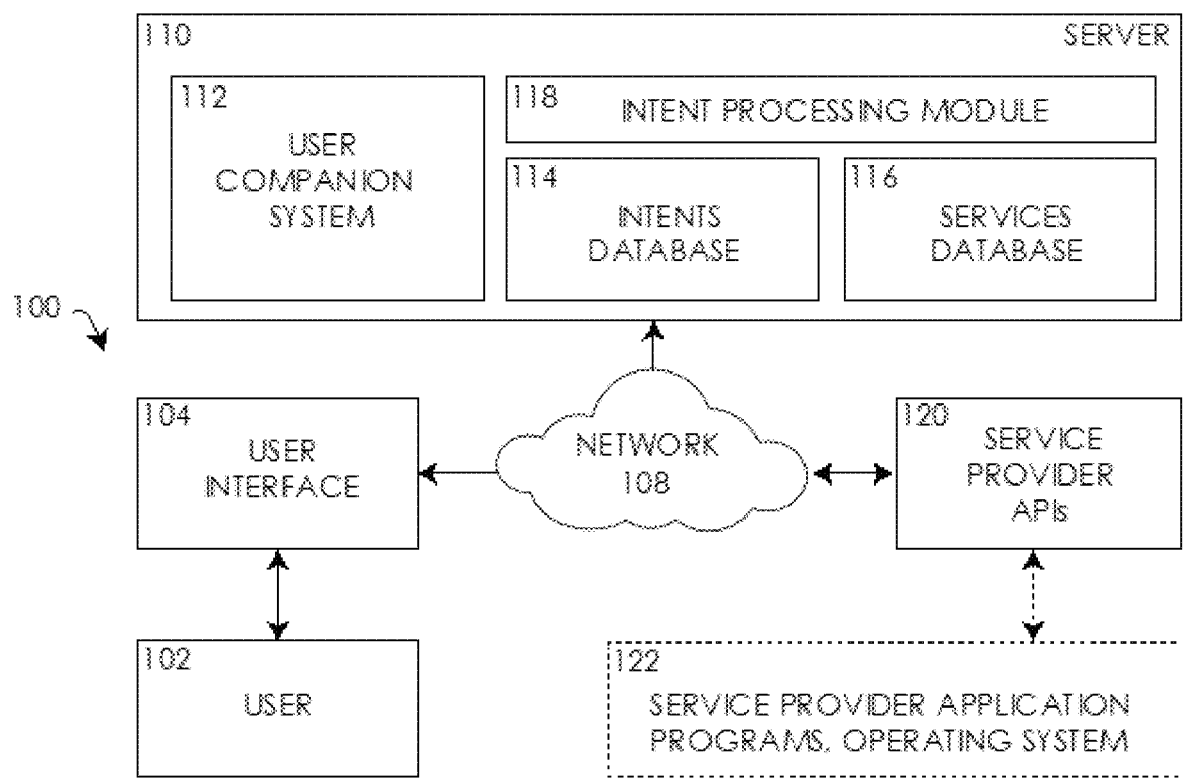
FIG. 1 is an exemplary block diagram of a system environment according to some implementations.

This disclosure, its aspects and implementations, are not limited to the specific components, assembly procedures or method elements disclosed herein. Many additional components, assembly procedures and/or method elements known in the art consistent with the intended user interfaces and related computing systems will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such user interfaces and related computing systems, and implementing components and methods, consistent with the intended operation and methods.

Computers have generally become a part of people's lives worldwide. Today's empowered users of digital devices, or computer systems, increasingly demand faster and frictionless experiences. This often requires, not only real-time response but also an understanding of what the user is actually seeking—intent—for the computer system to fulfill the user's in-the-moment need.

People use computers to improve efficiency, productivity, and accuracy when solving problems. Therefore, it is important to understand intent from perspectives of both service consumer, e.g., end-user, and service provider, e.g., computer system, to be able to communicate it clearly. Equally important is ability to detect intent. This ability can be considered the first step in understanding what is being communicated, whether it is a question, call for help, or reference that gives insights for other users to consult when making decisions.

This foundational nature of intent may dictate central focus on intent to correctly anticipate what consumers want and expect from providers throughout consumer-provider communication journey. Within the said journey, unambiguous intent could enable the provider to influence, not impede, consumer decisions toward their goal by providing to the consumer contextual guiding insights in real-time on the subject of desired communication.

Generally, computer systems continue to advance communication between both service providers and consumers in numerous ways. Specifically, computer can facilitate the application of technology to the problem of enabling communication among individuals whose abilities may not be sufficient to communicate clearly. Some of those inabilities include, but not limited to, lack of knowledge in a specific subject of desired communication; auditory or visual impairment; limitations caused by the device or technology being used, and so on. The field of Augmented and Alternative Communication Technologies (AACT) continues to promote computers and data processing methods to ease communication by reducing the amounts of input and effort required to produce desired messages.

In the present embodiment, communication pertains to human-computer, computer-computer, human-computer-human, and computer-human-computer messaging. In addition, the term "user" will be used interchangeably to refer to either a service consumer or service provider, regardless of perspective, unless specifically stated otherwise.

By understanding a user's preferred communication journey for a specific task, a better understanding of their intent could begin. Such focus on intent can provide constancy to short-term action, while leaving room for the user's reinterpretation as new opportunities emerge, say, resulting from changing preferences and/or situations. User preferences are the building blocks for piecing together expressions of intent. For example, in a message "I gave Ann a banana", user preference is person's name with value "Ann", fruit type is preference with value "banana", and "gave" is the value assigned to the preference action type. These data points shared by a service consumer during a specific session, such as "Ann" (for person's name) and "banana" (for fruit type), are their expression of preferences.

Specifically, user preferences are the variables chosen by a particular service consumer, or offered by service provider in intents or capabilities. Thus, the overall intent of the consumer can be expressed in preferences, and if the provider detects correlations to its own capabilities or functions, it can begin to understand what the user is trying to communicate and may trigger action to fulfill the consumer's goal. For example, let's say user entered data points "Ann" and "banana". If the computer system's database of intents had fields "person's name" and "fruit type", and they correlate with user's input then the computer system may suggest to the user the intent message "I gave Ann a banana" as a candidate intent for the consumer to confirm their goal. This type of intent detection, starting from preferences, could significantly automate communication through computers.

However, at the time of writing, state-of-the-art computer systems lack communication automation with dynamic intents. In particular, while supplying a user utterance (e.g., written or voice) that includes a special activation keyword will trigger an intent in a virtual assistant, those systems cannot easily detect intent category, or subject of desired communication, based on any consumer preferences. This limits their intents to simple hardcoded services like weather forecasting, playing music, or smart homes. As an example of the importance of intent detection from preferences, a customer may prefer one brand of cars but might not respond to any other model from that brand. User preferences can vary by category or subject of communication. This enables iterative communication of constantly pulling apart user preferences, putting them back together, re-applying them to different situations, figuring ways to clear misunderstandings empowering every user to derive meaning in their own way. Iteratively evaluating intent can provide consistent short-term action, while leaving room for the user's reinterpretation as new opportunities emerge from changing preferences and/or situations, making intents truly dynamic.

In the present embodiment, ability to detect intent from user preferences is the first step to understanding and categorizing what a user is trying to communicate beyond just the utterance. Those in the art will readily recognize that users generally communicate through preferences. As a further example, customers can define filters on products or service delivery preferences that specify which channel a message must be delivered to, or under what situations. This empowers the user with access to multiple channels to control: why, when, how, and where they receive messages. Also, service providers may alter the messages to suit the channel, i.e., category or subject of desired communication. It is also possible to categorize intents by preferences. For example, when communicating with multi-generational audience, it is usually preferred to segment messages based on generational preferences.

Within the field of AACT are state-of-the-art technologies that promulgate messages and insights to be communicated in several forms, including visual displays and synthesized images and/or speech. Use of preferences to recognize, perceive, express, or clarify intent is a good opportunity to apply in several real-life situations, according to the present embodiment; for example, in scientific applications, such as computer-aided design (CAD) software application programs, or social application domains, such as sign language.

In many advanced software applications, such as CAD programs, users must learn a lot of commands, multi-depth nested menus, or precise search-words to be productive. Usability of such programs is typically limited by ability of the user to learn precise commands, menus, or search-words. This need becomes important when other factors like the user's cognitive abilities such as intelligence, determination, creative thinking, or pattern recognition are considered. For example, users may be required to access multiple menu screens to perform simple functions. The problem is evident in users with communication difficulty as listed earlier. However, present day CAD, let alone many other software application programs, lacks ability to automatically detect user intent to minimize user input for increased productivity. It is preferred that such intent fit both the consumer's goal and capabilities of the provider in real-time based on the prevailing situation: context and subject. Instead, in present day CAD, usually the user must specify complex, and sometimes redundant, inputs to get hardcoded intents fulfilled.

Furthermore, at the time of writing, there is hardly any mainstream application with communication automation that is inclusive of auditory-impaired users. In particular there is no computer application program known to produce sign language for the auditory-impaired individuals without intervention from a human signer. This may be attributed to the complexity and variants of sign languages.

According to the World Health Organization (WHO), at the time of writing, there are more than 120 sign languages: virtually every country has one native sign language while other countries have additional variants. The United State (US) natively uses American Sign Language (ASL). According to WHO, over 430 million people worldwide suffer from disabling hearing loss disabilities. Many of them use sign language and/or text to communicate. They talk mostly using hands, fingers, and sometimes facial expressions, and typically prefer to read content when it is signed rather than text characters. Consequently, these individuals are mostly left behind owing to exclusion from the digitization that is increasingly dominating our daily lives. There is a long overdue need to provide an inclusive communication method to make computers more accessible for individuals, and teams, with impairments.

Usually, humans communicate fluently in natural language. Natural language processing (NLP), a branch of artificial intelligence (AI), helps computers communicate with humans in their own language and scales other language-related tasks. Artisans in the field of, say, computational linguistics, would assert that NLP affords a computer program the ability to understand human language as it is spoken and written, i.e., automatic computational processing of human languages. Yet, state-of-the-art voice interfaces or virtual assistants use NLP but lack support for auditory-impaired or deaf individuals. Specifically, they do not provide intents with sign language interpretations.

Although linguists consider both spoken and signed communication to be types of natural language, there is sparse relationship between word ordering of an English sentence and the corresponding sign language translation. For example, a spoken sentence "I gave Ann a banana" translates to "Me Ann—banana gave" in signed language. Simply rearranging sign language words in the order recognized is difficult to express in spoken language. Sign language usually expresses intent using independent words such as the verb "gave", and noun "banana"; omits articles (e.g., "a", "an", and "the") and prepositions (e.g., "at", "in" and "from"). Such discrepancies, along with the different variations of sign language, present technical challenges for machine-based translation and automation. We believe this contributes to the lack of sign language support in computer systems: operating systems and software application programs.

Accordingly, the implementations disclosed herein provide a system with communication capability for auditory-impaired individuals. To support sign language, the basis of communication would be preferences that ignore linguistic grammar, word ordering, articles and propositions only used for spoken or written language. This approach could mean identical intents between spoken and signed languages; "I gave Ann a banana" and "Me Ann banana gave" would produce the same result. Having a system with a database of predefined intents, comprising preferences in terms of verbs, nouns, facts, and actions may help realize intent detection based on user preferences, which is different from calling existing intents from a predefined trigger word predominant in most current technologies.

The implementations disclosed herein provide a computer system and method capable of understanding natural language and with ability to detect what the user wants to happen, produces suggestions to the user as one or more predefined intents that best fit their goal, and automatically associates a suitable service provider to serve the intent in real-time. Each intent belongs to a category and subject of communication, and maps to a capability of the service provider. Because these are predefined intents, each intent can be associated with actionable insights, such as illustrative pictures, videos, text, including sign language interpretations for each preference. This is in addition to the traditional forms of communication available in present computer systems. This way, sign language presentation to the consumer would be automated so that human signer would no longer be mandatory. Service providers would deliver intents with actionable insights that clarify the intents to the service consumers on computer systems including, but not limited to, operating systems and computer software programs.

The system would (i) allow a user to ask a question and, in response, get intents that align with the available services capabilities while fitting a request the said user wants to communicate by adding missing, or removing excess, words for purposes of communication; (ii) display results of a request along with actionable insights on meanings, action plan and/or expected outcomes of the intent; (iii) permit succinct preferences-based access to a library of commands and/or services from service providers; and (iv) perform tasks on a computing system, or service provider computer, or in a computer application program for any one or more subjects of communication only limited by the provider service capabilities.

Objectively, the system and method could enable use of natural language and alleviate users from being forced to memorize complex input methods and/or commands. As users will typically ask various different questions, the system should be dynamic, with intents and services popping in and dropping out as required to fulfill those intents. Such an approach would create significant flexibility to adopt new service capabilities, as well as extensibility to support different sign languages and custom actionable insights without need to re-deploy host computer systems.

The present implementation, in some embodiments thereof, relate to methods and system for providing intents to the user by fitting the user's goal to the computer system's provider service capabilities on any computer system while guiding the user with insights such as, but not limited to, sign language, voice, pictures, text, and videos for purposes of communication. Some terms used herein will first be explained.

"Data" is the raw and unprocessed facts that are usually in the form of text and numbers; it can be quantitative as in measured, or can be qualitative as in observed. By way of example, a question in natural language "Open a file by name" may be a user input data, in the present implementations. Generally, systems primarily store data in computer-friendly formats and it mostly lives in databases, or similar, such as spreadsheets.

"Information" is prepared data that has been processed, aggregated, and organized into human-friendly format that provides more context. Information is typically delivered in the form of data visualizations, reports, and dashboards. In the present implementations, an intent message constitutes the information model for the intent in a frame, wherein a message constitutes a verb and concepts in a specific situation, pertaining to a subject or category.

As used herein, an "actionable insight" is a representation of an unambiguous understanding of a concept in a specific situation for an intent to drive user action. Insights are the result of analyzing information in an intent, with the view to providing the user the ability to discern the true nature of a situation that a concept is intended. An actionable insight combines data and information, which guide the user to rethink a situation and steer them in a direction that may align with an intent. Insights set the stage for the discovery of situations that can then influence the user's decisions to drive the change the user wants through taking action. In the present implementations, actionable insights include media such as videos, audio, sign language, pictures, and explanatory text, integrated within intents. They are context-specific, succinct, and relevant to facilitating the needed user and system communication.

A "concept" is a noun in digital representation of a real-world thing (i.e., tangible), or idea (i.e., intangible) described with sufficient information to unambiguously express its meanings. By way of example, a real-world car is modeled as a concept in a computer system. But the word "car" by itself may not suffice because different individuals may interpret a car differently depending on their own knowledge and experience about a car. In response, in the present implementations, a concept is explicitly associated with actionable insights to embody, for example, what, why, how knowledge about the concept or which allowable actions may be taken on it. Different information may be presented to a user for the same concept dependent on situation and subject or category. In this respect, a concept may help individuals to make thought-out decisions when required to select one from a plurality of intents. For example, it will be apparent to those skilled in the art that a graphic used to depict a thermal analysis model of a car will emphasize features that are pertinent to the subject field, but which are different from a graphic for a 3D print model for the same car. Accordingly, different domain experts may reason about their own fields of expertise over the same concept, which will expose different data for the respective domain on the same car model, e.g., thermal, printing.

An "intent" is a message representing a system's service goal, which is generally a business goal, that may fulfill a goal with a user's desired outcome. According to the implementations disclosed herein, an intent is explicitly defined by concepts. As mentioned earlier, a concept is a noun expressing an entity. An intent comprises one verb and at least one concept, wherein a concept is an independent special word with a meaning that is specific to the subject and problem that the intent describes. Consistent with sign language, as discussed earlier, an intent is only defined in terms of concepts pertaining to facts and is independent of linguistic grammar; ignores the order of concepts, or lettercasings. Although articles may be generally ignored, they can be included for clarity to the user. The goal is to make intents concept driven in order to allow an intent to be expressed using any construct that includes words of the subject of desired communication. A valid intent is an independent clause, or a "bag of words", that expresses a complete thought in terms of relevant concepts. Let us consider intent message: "Change view to left side". If executed, the outcome would be the same action as from "Change left view", "Left view change for me", or even "Please change for me to left view". It should be apparent to artisans in the field that this intent can be generally identified with the subject or category called "Visualization".

An "animation" refers to a video or other sequence of images, pictures, gestures, or text that can convey the impression of motion and/or shape change. The animation may be computer-generated or live action captured from, say, a sign language presenter.

The present implementations recursively implement an intent itself as a concept. Using concepts disclosed above could also ease retrieval of a much smaller number of intents that closely fit a user's goal more effectively than returning hundreds of "hits" which must then be trimmed by hand; common when using most Web search engines. The approach also makes it easier to ask questions in plain natural language, because the fit between a user's question and intents are based on concepts representing real-world things or ideas, and which are independent of linguistic grammar.

Various implementations and aspects of the present subject matter are delineated herein below by way of various examples, and with reference to the drawings listed above.

Example 1: System Environment

FIG. 1 is a functional diagram of a system environment in accordance with an illustrative implementation. The exemplary system environment 100 may include a user 102, user interface 104, network 108, server 110, service provider APIs 120 for communicating with service provider software application programs or operating systems 122. The exemplary server 110 includes user companion system 112, intents database 114, services database 116, and intent processing module 118.

User 102 may be an individual, commercial, public, charitable, or other entity; it could also be another computer system. User interface 104 may be a single data processing system or a plurality of data processing systems that perform computer-executed processes for providing user 102 with an interface to a network 108. User interface 104 may be implemented as a single computer system or a plurality of computer systems including, for example, a 'set-top box' for receiving and displaying video telephone, television broadcasts, personal/digital assistant, mobile phone, or video gaming device. User interface 104 may be located in a user's home, at a business, in a public kiosk, in an automated teller machine (ATM), in an automobile or car, virtual assistant, or in a portable client device. Web applications running on server 110 may use server-side dynamic content generation mechanisms such as, without limitation to, ASP, CGI, Java servlets, or PUP.

Network 108 may be a single network or a plurality of networks that communicate information between, at least, user interface 104 and server 110. Network 108 may be any type of network for communicating information, including and not limited to data, text, pictures, voice and video. In some cases, network 108 has sufficient bandwidth to present visual content transmitted from server 110 to a user interface 104 in real-time. Network 108 may be shared, public, private, client-server, or peer-to-peer network encompassing a wide or local areas, including an Extranet, Intranet, Internet, and Local Area Network (LAN), Wide Area Network (WAN), Integrated Services Digital Network (ISDN), or any other form of wired and/or wireless communication networks.

Further, network 108 may be compatible with any type of communication protocol used by components of the system environment 100 to exchange information, such as Transmission Control/Internet Protocol (TCP/IP), Secure Hypertext Transfer Protocol (HTTPS), Realtime Streaming Protocol (RTSP), Global System for Mobile Communication (GSM), Wireless Application Protocol (WAP), User Datagram Protocol (UDP), File Transfer Protocol (FTP), high bandwidth wireless protocols (e.g., EV-DO, WCDMA), or peer-to-peer protocol. Network 108 may be provided by a single service provider or a plurality of service providers, such as an Internet Service Provider (ISP), a wired/wireless telephone service provider, an operator of WAN or LAN, or an operator of a point-to-point network.

Server 110 may be a single computer system or a plurality of computer systems including, for example, a personal computer, microcomputer, microprocessor, workstation, or similar computer platform. Server 110 executes computer-executable instructions for providing services to a user interface 104 over a network 108. Within server 110 is a user companion system 112, intents database 114, services database 116, and intent processing module 118. User companion system 112 allows user input to specify one word or a plurality of words of a subject of desired communication or plurality of subjects of desired communication. Upon receiving request from user interface 104 over a network 108 or otherwise, user companion system 112 may retrieve text corresponding to a single word or a plurality of words from intents database 114. User companion system 112 may then map the text to a single intent or a plurality of intents, wherein an intent aggregates concepts as keywords representing a goal. In turn, every intent in the intents database 114 is exclusively linked to a predefined service API stored in a services database 116. Intent processing module 118 is responsible for performing an action required by an intent or a plurality of intents through executing on corresponding service APIs in a target service provider platform and/or software application programs, returning results to the user companion system 112, and back to user interface 104 via the network.

Services database 116 is a local database for all service provider APIs. Every service provider must register their APIs with user companion system 112 for authentication, using tools already known in the art, and to be automatically discoverable in real-time. If a service from service provider is successfully registered, all corresponding service provider APIs 120 are stored in services database 116 for access. The server 110 may evaluate these APIs and determine which of the communications to allow or reject. If a request is approved and authorized, user interface 104 may communicate with user companion system 112, or services database 116, via network 108.

Once communication is established, service provider APIs 120 may interact with a computer application program, a plurality of computer application programs, a computer operating system, a plurality of computer operating systems, telephone, television, virtual assistant devices, or the like, whose provider services 122 may be accessible on a network 108 via APIs. In some cases, user 102 may receive information from service provider APIs 120 at a user interface 104. By way of example, service provider APIs 120 may be connected and interacting with a vendor software program 122 for CAD, and user 102 may want to view message cues that the CAD program is producing. Such information could be displayed in user interface 104 transmitted from the service provider APIs 120 through network 108. Since each service API has a corresponding intent, a user companion system 112 may present to user 102, at user interface 104, additional information such as sign language video animation, beside other message cues (e.g., text, pictures, and audio) used to clarify concepts.

Let us now spend some time clarifying the general interaction between the components 102 to 122 depicted in the FIG. 1. To begin, user 102 may employ user interface 104 to specify words of desired communication by means of, say, text, voice, pictures, video, sign language, and so on. For example, user 102 may want to create a "solid box" shape. User interface 104 may transmit user input to server 110 through network 108. Any user input other than text, e.g., speech, is first converted, on server 110, to text using technologies 112 via service provider APIs 120. In response, server 110 may then produce an intent message from user companion system 112 to user interface 104. In some cases, additional information, e.g., visual content corresponding to intent, may be transmitted along in the response. Alternatively, once the intent is received, user 102 may alter the words in the produced intent to match their goal. For example, user 102 may want to alter the original intent input "Create a solid box" to "Create a solid cylinder" in the user interface 104, and receive a different intent or a plurality of intents from server 110 based on the revised intent. User 102 confirms specification by submitting the specified intent. The specified intent instructs user companion system 112 to direct the intent processing module 118 to execute the intent in order to fulfill the goal of user 102. During intent execution, intent processing module 118 internally executes calls to the communicating vendor CAD system 112 via service provider APIs 120 using the API service designated to the intent. The CAD system then executes the operation to fulfill the specified intent. Upon completion of the operation, server 110 transmits the outcome (i.e., the solid cylinder) to user interface 104 via network 108. User 102 may issue as many intents as needed to build, even complex, product models to fulfill their need.

The general illustrative example of a system environment 100, depicted in FIG. 1, includes a single user 102, user interface 104, network 108, server 110, and service provider APIs 120 for communication with service provider software application programs and/or operating system 122. However, it is apparent to an artisan in the field that in real-life situations practical implementations may include a plurality of users, user interfaces, servers and/or service provider APIs, linked over the network by a plurality of network exchange points sharing data between the plurality of networks. Server 110 may also be included in a user interface 104, eliminating the need of a network 108. Similarly, service provider application programs and operating systems 122 may be included within a server 110, eliminating need for service provider APIs 120 or network 108.

Example 2: Existing User Interface Integrating a User Companion System

Figure 2:
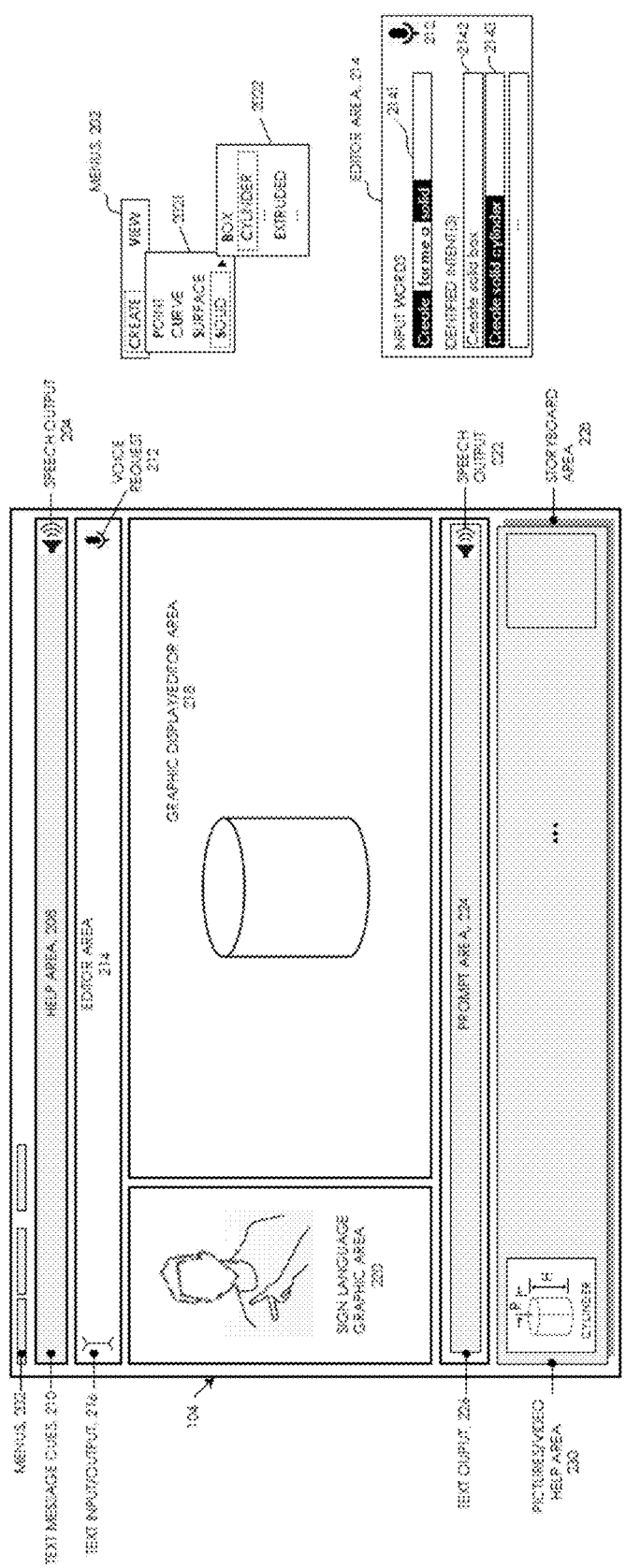
FIG. 2 is an illustrative user interface of a software application program integrating a user companion system according to an illustrative implementation.

FIG. 2 shows an exemplary graphical user interface (GUI) 104 illustrating aspects for integrating a user companion system 112 in an existing computer system's user interface according to an implementation. In general terms, a GUI facilitates human interaction with an electronic device or a computer system. In the present example, a GUI of a typical CAD application software product is extended with aspects of the present implementations.

As is readily apparent to those skilled in the art, traditional GUIs include menus, which enable a user to specify commands and perform tasks within the application. Reference is here made to FIG. 2, which illustrates menus 202 of nested submenus 2021 and 2022. Let's now compare traditional GUI menu commands against natural language commands in the implementation.

As an example of the traditional GUIs, to create a solid cylinder, a user 102 may navigate menus in a user interface 104 as follows: first, select "CREATE" in a top-level menu 202, followed by "SOLID" in submenu 2021, and, finally, "CYLINDER" in nested submenu 2022. This traditional menu selection activity could be perceived as a "three-depth message", say: "create-solid-cylinder". What actually happens internal to the CAD application software program can be described as follows. Once user 102 selects "CYLINDER" submenu 2022, a command underlying this selection is invoked to execute on user goal. The command so-invoked will, in turn, trigger the CAD software program to directly fulfill the request for generating a solid cylinder and displaying the result in a graphics display 218. During execution, the CAD program could fulfill the intent locally or may invoke a remote service through service provider APIs 120.

In contrast, let us now illustrate the same request but in the context of the present implementations, and leveraging natural language. Drawing analogies between the traditional approach and the implementations: the user action "create-solid-cylinder" described earlier could optionally be expressed in a single intent message, say, "create solid cylinder" or even "solid cylinder create" since concepts are ordering-independent, as explained earlier. A difference here is that, while in the traditional menu, "create" and "solid" are redundant actions, usually hard-coded by the software programmers, in the present the "three-depth" menu is replaced with a single message in natural language. It does not require the user to memorize where to find the first menu item to get started with creating a cylinder in the first place.

As illustrated in the FIG. 2, user 102 inputs a text message "Createfor me a solid" 2141. In response, user is presented with multiple candidate intents that closely match the text in the input message, illustrated by way of example, as "Create solid box" 2142, and "Create solid cylinder" 2143. Another added advantage is efficiency: a user may easily benefit from autocompletion features in terms of predefined intents, which enables user 102 to only provide few input words to get suggestions, which are the available service capabilities of the CAD system. In this regard, autocompletion makes apparent to those skilled in the art that this is more efficient than the traditional menu example above.

Use of predefined intents enhances autocompletion with, not only correct word spellings but also, offers a small number of concise intents for which the user is guaranteed to select a service that is available in the software application program. In addition, user 102 receives concise intent messages that include, not only essential words but also produce actionable insights that clarify what outcome that the user can expect. As an example of concise intent messages produced, in the message by user "Create for me a solid" 2141, only "create" and "solid" are highlighted in the user input field 2141 because these are recognized as concepts by user companion system 112, whereas the other words {"for", "me", "a" } are ignored in this example. In other words, "Create solid" is considered to be the same as "Create for me a solid", in the example.

In the present implementations, once the user 102 confirms an intent selection, the user interface 104 communicates with the server 110 via network 108, which in turn triggers the vendor CAD system 122 via the service provider APIs 120. Specifically, upon receiving the message text "create solid cylinder", or equivalent, server 110 reaches out for user companion system 112 to determine existence of an intent with concepts that match the words in the input text. In this case, because an unambiguously matching intent exists in an intents database 114, the user companion system 112 validates the request and reaches out to the intent processing module 118 for execution on the action defined by the intent.

Upon recognition of the intent, the user companion system 112 may produce additional information associated with the intent, e.g., actionable insight, say, sign language in the sign language graphic area 220 of the GUI 104, as shown in the FIG. 2. As discussed earlier, user 102 may confirm specification or alter the intent message text presented to the user before proceeding. Let us consider the case where the user 102 confirms to generate the requested cylinder without altering the intent message text 2143 suggested by the user companion system 112. Using the concept-driven interaction in the present implementations, generally, user companion system 112 may iteratively pull concepts apart, put them back together, and dynamically re-apply to different situations to fit user goals against the intents available within the intents database 114, in addition to the prevailing state of the CAD model. During the process, the user companion system 112 analyzes the identified intents to automatically discover corresponding services capabilities (from the services database 116) and actionable insights, which help the user 102 to efficiently interpret concepts and intents with minimized cognitive burden.

Because each intent has an exclusive link to a service API, the intent processing module 118 is able to reach out to a service database 116 and retrieve all service API parameters. In turn, a service API maps to a unique API in the service provider APIs 120. This is one motivation for registering service provider APIs 120 with the user companion system 112 beforehand to be authorized for automatic discovery later in the services database 116. This also allows to only make available tested or proven services capabilities and intents to users.

Next, the intent processing module 118 may invoke the vendor CAD application program 112 via the service provider APIs 120 using the API parameters. The remote CAD application program 112 performs the needed action to fulfill the intent request, i.e., to create cylinder, in our running example. Upon completion, results from the CAD application 122 are pulled by the user companion system 112 via service provider APIs 120 and network 108. The result cylinder can be then rendered in the graphic display/editor area 218, as illustrated by way of example in the FIG. 2.

In certain cases, user 102 may enable speech output 204 to read out text message cues 210 in help area 208. For example, in the activity to create a solid cylinder, GUI 104 may prompt user 102 for numerical values for the cylinder sizing, e.g., values for the radius and height parameters, respectively. However, prompts are not limited to numerical values only. They can also be textual, for example, real-time instructions directing user 102 to perform a specific action, e.g., to hit RETURN key, before proceeding to the next procedural step, typical in CAD modeling in which several steps are often required to accomplish a task. The prompt area 224 is read-only, presenting text output 226 to user 102—this could be default behavior. In some cases, however, speech output 222 may be enabled by user 102 for purposes of automatically reading out the text 226 in prompt area 224.

It may be worth mentioning that the prompt area 224 associates itself with both the sign language graphic area 220, and editor area 214. Accordingly, whenever the prompt area 224 receives an intent from user companion system 112, the sign language graphic area 220 may also receive and present visual content meant to clarify the intent in real-time. This is especially important to be inclusive of auditory-impaired individuals so they receive the same actionable insights as everyone else. Correspondingly, the same text in the prompt area 224 is also displayed in the editor area 214. In some cases, the editor area 214 may allow user input, of which the data input requirements (e.g., numeric or text, etc.) depend on context and instruction needs in the prompt area 224 and/or in sign language graphic area 220. As discussed above, for example, if a cylinder height is requested then a numeric value input field is enabled automatically in the editor area 214.

In certain cases, the editor area 214 may take a voice request 212 if user 102 enabled the feature. In this illustrative example, the feature may be enabled by clicking once on the microphone symbol 212 within the editor area 214; it may be disabled as toggle by clicking the second time. An artisan in the field will readily identify other methods of enabling or disabling voice that could be used besides clicking on the microphone symbol illustrated in the FIG. 2. An example is through a prescribed key combinations on a keyboard, or other preferred means. If the voice feature is enabled, user 102 voice is automatically translated to text, using speech-to-text technologies, and displayed in the editor area 214 in real-time.

In other cases, user 102 may want to alter the produced text to clarify or change the intent message. User 102 may do so by editing text directly within the editor area 214. In response to the revised request, the user companion system 112 may update all the pertinent message cues in GUI 104, as discussed above. If no intent is recognized to match the new user input data, user 102 may be informed accordingly via the prompt area 224. If a plurality of intents were identified from user input, a list of intents is produced and presented to user 102 in user interface 104, as illustrated earlier:2141, 2142, and 2143 in the FIG. 2. In this situation, user 102 may navigate the list of suggested intents—with help of optional clarifications from actionable insights—and confirm input specification by selecting from the list of presented intents, an intent they think best fits the goal, e.g., "Create solid cylinder" 2143 in the FIG. 2. Upon user 102 confirming selection, the text in editor area 214 is updated to the user's desired intent.

In yet other cases, user 102 may decide to not proceed with the change request. In this situation, the present text in the editor area 214 is not substituted for the new altered text. However, in certain cases, the user 102 may continue to modify the text as desired. As before, for every message in the prompt area 224, sign language video animation is also presented in sign language graphic area 220. The user 102 may disable or enable sign language video animation display through, but not limited to, the system settings (not shown for simplicity) from the menus 202 at any time. If the sign language feature is disabled, the window for displaying sign language video animation 220 is hidden and no longer visible in GUI 104. Enabling the feature enables the sign language window graphic area 220 accordingly.

In yet other cases, user 102 may decide to not proceed with the change request. In this situation, the present text in the editor area 214 is not substituted for the new altered text. However, in certain cases, the user 102 may continue to modify the text as desired. As before, for every message in the prompt area 224, sign language video animation is also presented in sign language graphic area 220. The user 102 may disable or enable sign language video animation display through, but not limited to, the system settings (not shown for simplicity) from the menus 202 at any time. If the sign language feature is disabled, the window for displaying sign language video animation 220 is hidden and no longer visible in GUI 104. Enabling the feature enables the sign language window graphic area 220 accordingly.

In most cases, an intent generally includes mediums. As used herein, mediums are linked to an intent to provide actionable insights to a user 102, including clarifications on the purpose of the intent itself, typically with succinct examples of how the intent may be used to solve a situation, and these may include expressive pictures, videos, etc. GUI 104 may present a single picture or video, or a plurality of both in a pictures/video help area 230.

Informational text is presented in the help area 208. For example, when user 102 navigates to an intent in a list of intents presented in user interface 104 such as "Create solid cylinder", a corresponding annotated picture thumbnail of a solid cylinder, with clearly annotated concepts pertaining to a cylinder per intent specification, is presented in the pictures/video help area 230.

Additionally, user companion system 112 may capture history on all the steps and user 102 decision points (i.e., confirmation, not cancellations) in the user's journey while they perform tasks, as a user's option. If user 102 enables this feature, history information may be kept private to the user 102, local on user's own storage device. User 102 may later play back the history in a storyboard area 228 of the GUI 102, as needed.

It will be apparent to those of ordinary skill in the art that methods involved in the example may be embodied in any computer program products that generally involve interaction with a user or a plurality of users. FIG. 2 is only a simplified depiction of aspects of a layout for a GUI of a typical CAD software application program product 122, extended with a user companion system 112 according to an illustrative implementation. As is readily apparent to an artisan in the field, practical implementations may integrate a user companion system 112 in user interfaces of applications for other industries (or fields of application) such as finance, e-commerce, word processing; or devices, such as televisions, personal digital/virtual assistants; in websites, such as web applications or bots; in platforms, such as computer terminals, command-lines, and other computer systems management; or any other technology with, or requiring, at least one user interface. In those application programs, a user companion system's services may be only limited by the capabilities of the service provider application programs, or the operating system integrating it.

It may be worth pointing out that, depending on industry and intended use of a user companion system 112, a user interface 104 may have different features and/or layouts with some or all of the functionality discussed above. For example, while a CAD software application program may employ a 3D graphics display area 218, a word processing software application may only require a lightweight editor area 218 of text, and simpler graphics such as pictures instead of heavyweight 3D graphics. In such application programs, an exemplary graphics area as in FIG. 2 could be replaced with a text editor. In short, any user interface may integrate the user companion system 112 of the present implementation to add some or all of the features it offers.

Accordingly, at computer systems management level and for an operating system such as, but not limited to, Windows, Linux or iOS a command console or command shell could be integrated in the editor area 214, excluding graphics display/editor area 218 while retaining the other user interface 104 elements preferred by the user 102, as well as introducing a sign language graphics area 220, which is absent in present operating systems. Additionally, in certain software application programs, traditional menus 202 may not be necessary. A good example is virtual assistants, which may only use voice and, in some cases, text. In such a configuration, the virtual assistant could be then extended with sign language video animations or other visual content for actionable insights as illustrated in the present implementations.

In short, the present implementations may be integrated with virtually any computer system that includes, or needs to include, a user interface or a plurality of user interfaces along with the integral capabilities offered by the user companion system 112.

Example 3: Server for a User Companion System

Figure 3:
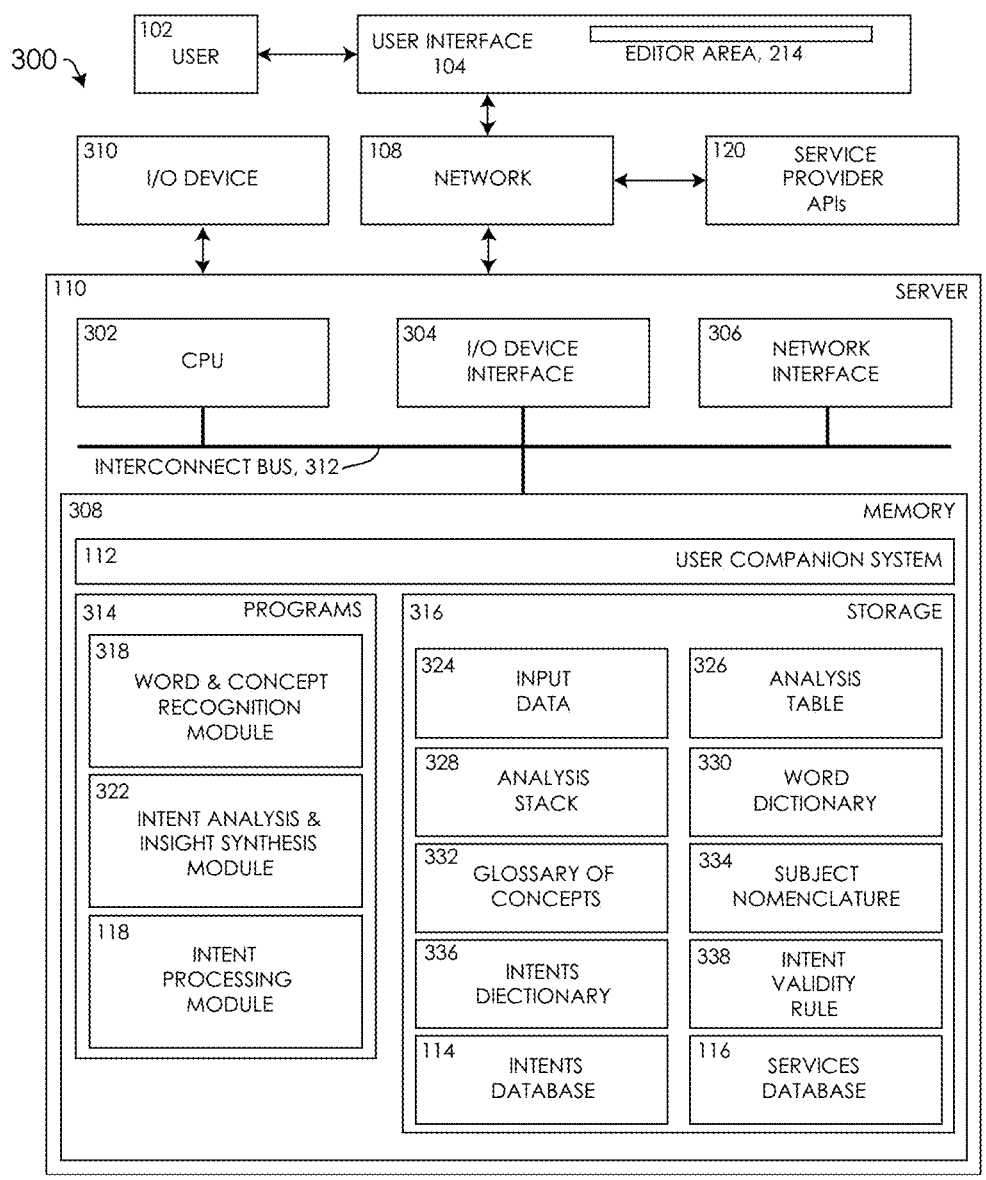
FIG. 3 is an illustrative server for a user companion system integrated with a user interface according to an illustrative implementation.

FIG. 3 shows a functional block diagram of a general-purpose computer system 300 for performing the functions of a server 110 according to an illustrative implementation. The exemplary server 110 is realized by a computer having a central processing unit (CPU) 302, memory 308, and an interconnect bus 312. The CPU 302 may include a single microprocessor or a plurality of microprocessors for configuring server 110 as a multi-processor system. The memory 308 illustratively includes a main memory and a read-only memory. The server 110 also includes a mass storage device 316 having, for instance, various disk drives, and tape drives, etc. The main memory 308 also includes a dynamic random-access memory (DRAM) and high-speed cache memory. In operation and use, the main memory 308 stores at least portions of instructions and data for execution by the CPU 302. Server 110 may also include one or more input/output (I/O) devices 310 (e.g., keyboards, mouse devices, pen inputs, displays, microphones, loudspeakers, and other devices) that allow for communication with server 110; an I/O device interface shown by way of example as interface 304 for data communications to I/O devices 310; network interface 306, which provides server 110 with access to external network 108 and computing devices.

The computer system 300 also includes I/O ports or may use the interconnect bus 312 for interconnection with, say, a local display and keyboard, or the like, serving as a local user interface 104 for data entry, retrieval, or manipulation purposes. Alternatively, server operations personnel may interact with the system 300 for controlling and/or accessing the system from remote terminal devices via the network.

Stored in the main memory 308 at a predetermined memory area are the mass storage 316, programs 314, and user companion system 112. Mass storage 316 will be discussed in detail next, then programs 314, and, finally, user companion system 112.

Mass storage 316 may include a single magnetic disk or a plurality of magnetic disks or tape devices or optical disk drives, for storing data and instructions for use by the CPU 302. At least one component of the mass storage system 316, preferably in the form of a disk drive or tape drive, stores the databases used for processing the computer system 300. Mass storage 316 may also include a single drive or a plurality of drives for various portable media, such as a floppy disk, a compact disc read-only memory (CD-ROM) or an integrated circuit non-volatile memory adaptor (i.e., PC-MCIA adaptor) to input and output data and code to and from the computer system 300.

In one implementation, mass storage 316 incudes a plurality of storage devices or media that are interconnected via a communications network 108. The plurality of storage media may interact such that the storage media function is a virtual mass storage system 316. One or more storage media may reside in separate locations while being interconnected electronically. Specifically, storage area 324 includes input data from, say, user interface 104. Storage area 326 includes an analysis table to be used by programs 314. Storage area 330 includes a standard word dictionary for spellings, meanings, and part of speech for each word in a language of desired communication. Storage area 332 includes a glossary of all concepts for the plurality of subjects of domains/fields supported by user companion system 112. A subject pertains to a branch of knowledge studied or taught in school, college or university and may correspond to a theme, subject matter, or topic. While a subject may refer to a specific topic, it may also refer to a category, or field of practice also known as domain herein, such as Visualization, Networks, Geometry, or Finance. Storage area 334 includes subject nomenclature, wherein nomenclature provides unambiguous specific vocabularies of words and meanings within a subject of intent. For example, "CAD Viewer" may be considered as a topic within the subject of Visualization. Similarly, "Network Statistics" (e.g., a record of computers and their interconnections on a network) can be considered a topic within the subject "Networks", according to an illustrative aspect of the present implementation. Storage area 336 includes intents dictionary for intents that are available to user companion system 112, which also reflect capabilities 122 of the system as delivered by the service provider operating systems, and/or software application programs. As discussed earlier, each intent has a corresponding service API in the services database 116, wherein each service is a system capability.

Storage area 338 includes intent validity rule that is applied to a corresponding intent in the intents dictionary 336. Storage area 116 is a database of known services and their associated service APIs available in, for example, operating systems, or software application programs; as discussed earlier using the CAD software application program example.

Service APIs stored in the services database 116 are independent. That is, they may be implemented by service provider computer systems, and thus may be executed on those systems directly, say, on a command-line of an operating system on which the command is implemented; or on a web interface sending requests through service provider APIs 120 to the provider services 122. Storage area 114 includes a database of predefined intents, wherein each intent is exclusively linked to a unique service API in the services database 116.

Let us now return to the main memory 308 and, specifically, programs 314. The computer system 300 may run a variety of programs or modules and store associated data in the mass storage 316, as previously mentioned. One or more such programs may enable the server 110 to monitor and control access to certain service API information being requested by external service provider APIs 120. It is worth noting that a single memory 308 is shown only for simplicity. The various features stored in memory 308 may be stored in different physical memories, including memories remote from the server 110, but all of which are accessible by CPU 302 via internal data connections, such as interconnect bus 312. As will be readily apparent to an artisan in the field, one or more elements of server 110 may be located remotely and accessed via network 108, for instance, a user interface 104.

Within programs 314, modules produce intents from input data 324 supplied from a user 102 input. Programs 314 perform on various procedures. These procedures encompass module 318 for recognizing domain concepts from words, in natural language, in the input data area 324; module 322 for analyzing intents identified in module 318, fitting user 102 goals with services capabilities through communications with user 102 to identify an intent that meets the said user need; and module 118 for processing intents, i.e., executing service APIs by invoking commands or APIs on service provider operating systems and/or applications in the external interface module 122 (see, again, FIG. 1) via service provider APIs 120.

Let us now discuss user companion system 112. A user companion system 112 can be used to produce predefined intents aligned with the programs 314, which execute on services. A discrete hardware structure may be used for execution of word & concept recognition module 318, intent analysis & insight synthesis module 322, and intent processing module 118.

FIG. 4 shows details of analysis table 326, which stores data as "bag-of-words" 49 obtained by analyzing user input data 324, which may be supplied through I/O device 310 from input devices such as, but not limited to, keyboard or microphone. Bag-of-words is apparent to those skilled in the art of natural language processing and information retrieval. Specifically, it allows text to be represented disregarding grammar or word order but keeps word multiplicity. Analysis table 326 (FIG. 4) includes the following fields: input word 41 from user, intent word 42, part of speech 43, intent word meaning 44, corresponding command word 45, word index position in command 46 within an intent, missing words 47 relative to the intent, and excess words 43 relative to the intent.

FIG. 5 is an example glossary of concepts 332. It stores part of speech 43 of each word 51 in alphabetical order, and all supported subjects of communication 52, such as "Networks" or "Visualization", to which the concept applies.

FIG. 7 is an illustrative intents dictionary 336; it stores a command name 71—this is always a standard name as used by the target operating system; subject domain of communication 53; meaning of each option or alternative 73 for the command; a unique, assigned intent name 74 for each command option; intent message 75, and additional insight information 76 for the intent, i.e., information pertaining to the command. Examples of actionable insight may be presented in the form of clarifying text, pictures, sign language video animations, or other topic-relevant videos.

An intents dictionary 336 segregates different options in a command into one intent per command option. The aim is to provide a unique intent per option explicitly defined. Effectively, each intent has a single responsibility, which also implies the intent will execute only one option in a command that offers multiple options. As a result, there are as many intents per command as there are options in the said command. This way, an intents dictionary 336 groups intents into categories, or "families of intent", based on command name in the operating system. For example, again in FIG. 7 an illustrative command name "NETSTAT", a standard operating system command, apparent to an artisan lists multiple options. For simplicity, only four options are included. Since, in the present implementation, each intent maps to a unique option, an intent has non-conflicting semantics among a plurality of commands in the service database 116. Thus, as used herein, all intents associated with the same command name define a family of intent, that is, "NETSTAT" in the example.

FIG. 8 is an example subject nomenclature 334 of a subject of communication within an intent frame. It stores words 81 on the subject, part of speech 43, word meaning 82 on the subject 53, and family of the intent 83. For example, within the subject 53 called "Networks" is a list of words that, while ubiquitous to the subject domain, have meaning specific to the purpose of the intent. Meaning is expressed in a natural language statement, which helps computer systems to communicate with humans in their own languages and scale other language-related tasks. Besides, every meaning can be associated with actionable insights, such as pictures and sign language video animation, with specific context to further clarify the intent.

The previously mentioned implementations may be realized as software components operating in a system 300, wherein a server 110 is Linux-based or other type of workstation. Equally, other operating systems may be employed as, without limitation, iOS, Unix or Windows. Software may be implemented as a computer program written in any high-level language including, without limitation to, C++, C#, Fortran, Java, Visual BASIC, JavaScript, Ruby, Haskell, or any low-level language such as C, or other. Certain script-based programs may be employed such as XML, JSON, WML, PUP, Python, and so on.

Additionally, a variety of programming techniques for high-level programming may be employed to implement a computer system such as disclosed herein. It is preferred to implement the implementation on a computer using an object-oriented data processing system. In general terms, an object-oriented data processing system is partitioned into a number of "objects", wherein each object is dedicated to performing certain predefined functions but with one goal. Each object further includes an interface, which allows it to receive requests from other objects to perform functions, and to provide data to other objects.

As used herein, a concept may be implemented as an object. Accordingly, hereafter, an intent may be implemented as a frame-based object.

Example 4: User Companion System Integration in User Interface

Figure 9:
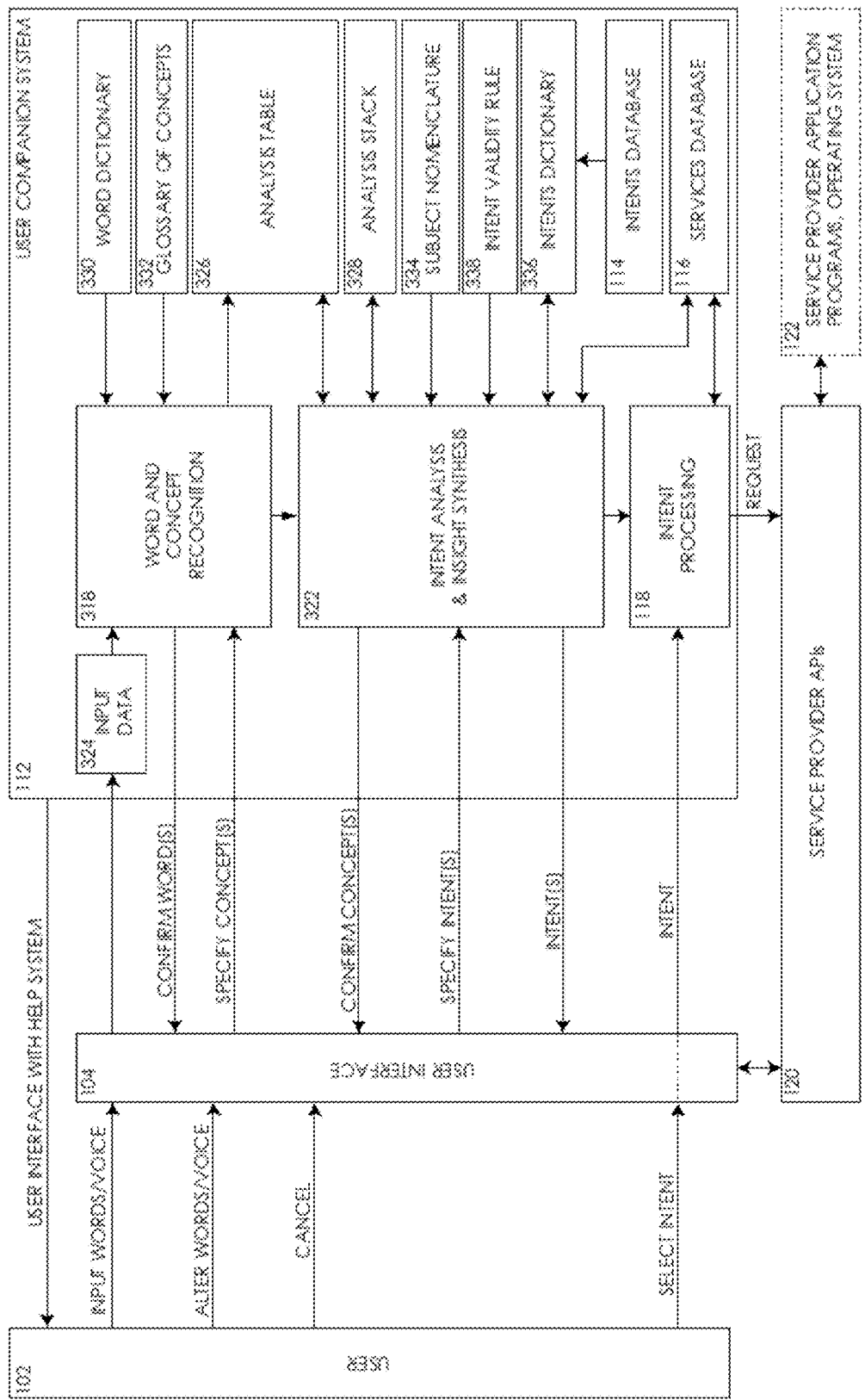
FIG. 9 is an exemplary typographical representation of relationships within and between aspects of user interface integration with a user companion system in accordance with an embodiment of the implementation.

FIG. 9 is an exemplary typographical representation of relationships within and between objects of a user companion system 112 integration in a user interface 102 according to a preferred embodiment of the present implementation.

In one embodiment, the user companion system 112 can provide a user interface 104 to assist users 102 when solving problems using computer systems in general. A user interface 104 may include an instance of a user companion system 112 that interacts with a user 102 to provide assistance for purposes of supplementing user knowledge. For example, user companion system 112 may be trained to serve requests made by a user 102 in order to perform an action on behalf of the said user 102. User 102 may be an individual, a computer, a computer software program, or other type interacting with the user companion system 112. In other cases, a user interface 104 is automatically provided to a user 102 such as when signing into the user companion system 112.

Once a user interface 104 becomes available, a user 102 may interact with user companion system 112 by inputting data via the said user interface. Input may include, but not limited to, text or voice data. On one hand, input from a user 102 may be a query asking user companion system 112 to return information only, e.g., ask for account details of a user. A query is a read-only operation; it does not modify data. On the other hand, input can be a command to actually modify data, e.g., add a new user account. For simplicity, the term "request" will be used, hereinafter, to refer to either a query or command unless explicitly stated otherwise. The term command will be used strictly for operating system, or scripting, instructions for execution on a service provider computer system, and may not be confused with a request on an intent.

Input data 324 received by the user companion system 112 from a user interface 104 is converted to text, if user input is not text type. If input data 324 is not text type, well-known technologies in the art can be used to convert such input to text first, e.g., speech-to-text. This ensures that input data 324 is always text prior to word & concept recognition 318. Upon receiving input data 324, user companion system 112 may determine a response that best fits both the user's goal and the capabilities of services 122 in the services database 116.

As further discussed below, and using FIG. 9, the operations to be executed upon user requests will be demonstrated using examples.

Upon receiving a request with input data 324, words in the input text may be generally recognized by means of natural language processing against word dictionary 330. This step ensures correct word spelling in a language of desired communication, e.g., English. This is important because correctly spelled words are needed to unequivocally recognize concepts against glossary of concepts 332, as will become clear later. The correctly spelled input words are then loaded in analysis table 326 introduced earlier using FIG. 4. Details on word & concept recognition module 318 will be given later in FIG. 10.

Still referring to FIG. 9, next, with intent words 42 (see FIG. 4) or concepts are read from analysis table 326, and using the analysis stack 328, intents dictionary 336, and intent validity rules 338, candidate intents can be identified. The intents dictionary 336 provides a summary version of the elaborate intent data models in intents database 114 and, together with the subject nomenclature 334, is used to complete intent specifications to be presented in user interface 104 for user 102 navigation and specification. Details on intent analysis & insight synthesis 322 will be given later in FIG. 11.

Finally, the intent attributes or preferences specified by user 102 can be used to retrieve the corresponding intent from the intents dictionary 336 for subsequent execution by the intent processing module 118. The intent is then used to retrieve a corresponding service API or command from the services database 116, for execution in external service provider computer system. The service API or command is then sent in a request to service provider APIs 120, which subsequently executes the operation to fulfill the intent on the computer system with an intended service provider computer software program or operating system 122. On completion of the operation, results are sent back to service provider APIs 120, which transmit the outcome to user interface 104 for presentation to user 102. Details of intent processing 118 will be given later with reference to FIG. 15.

In the following sections, input data 324 will be used in a running example. Say, user 102 makes a request "Show me network connections!" in a user interface 104 that integrates a user companion system 112. While the foregoing example describes the implementation on computer application programs, the present example illustrates user interaction with operating systems.

Figure 10:
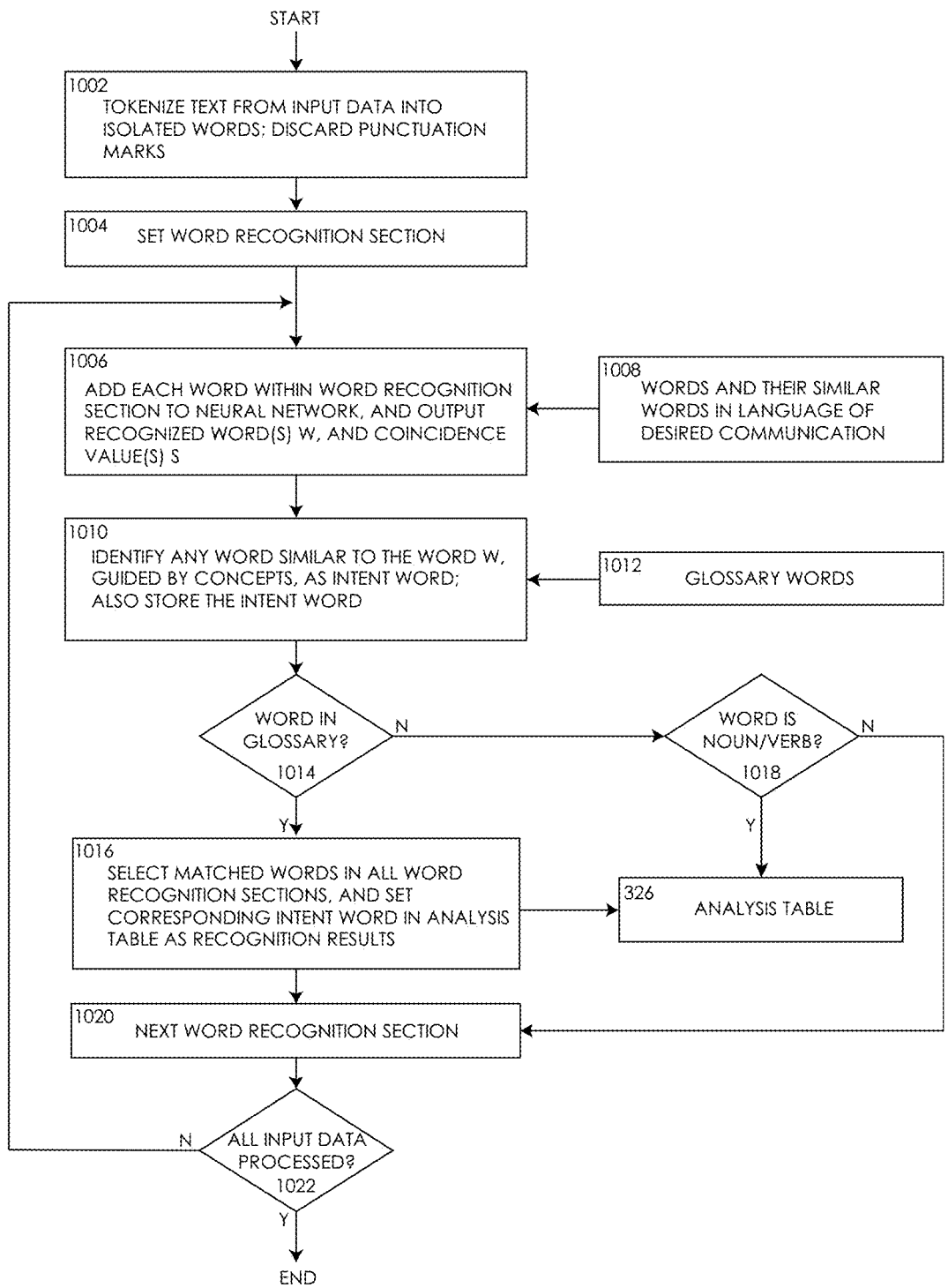
FIG. 10 is a flowchart of a word and concept recognition procedure according to an illustrative aspect of the implementation.

Details on word and concept recognition 318 procedure will be described using the example flowchart in FIG. 10 next. A general overview is outlined prior to specific steps in the flowchart.

Generally, words from user input data 324 are recognized by employing principles of word recognition and using a standard word dictionary 330 in a language of desired communication. In this example, English is chosen for illustration purposes only. Technologies such as auto-correction and predictive text may be used to ensure, not only correct spellings but also, suggestions of words a user 102 may not easily remember without assistance. Glossary of concepts 332 is a collection of words used by all service APIs, for use throughout communications with user companion system 112. These are also used to reference the concepts defining intents in the intents database 114 as part of ubiquitous language for various fields of application domains and available services capabilities, i.e., service provider application programs and operating systems 122. The glossary of concepts 332 is used everywhere and throughput businesses and technologies, i.e., ubiquitously. This enforces a shared vocabulary for communication with focus on users 102, services capabilities, and the problems being solved.

Returning to FIG. 10 for specific steps, the procedure starts by taking user input data 324 from user input 104. Repeating here for convenience, user request in the present example is the expression: "Show me network connections!".

At step 1002, the input text is tokenized. Tokenization is a process of breaking up a sequence of strings into parts such as words, phrases, symbols, and other elements, collectively called tokens, with all punctuation marks ignored.

Simplifying the example for clarity, only isolated words are stored; other information such as order of words, grammar, letter-casing, etc., are discarded, but word multiplicity is retained. In this step, contextual information is disregarded with focus on data, namely, "what" words occur in user input, not "where" they occurred. In the example expression, the input words 41 (see, again FIG. 4) are {"show", "me", "connections", "network"}.

At step 1004, a word recognition section is set to an initial value. For purposes of illustration, let us take the input word 41, "show".

At step 1006, the last word set in the word recognition section is taken out and input to an already learned neural network (NN). The NN then outputs the recognized words W along with their coincidence values S. The closer an input word matches an already learned word, the larger the coincidence value is. If there are a plurality of similar words W having the same coincidence value S, these words may be output as a plurality of candidate words. Take, for example, the initial word W "show" in the example: a NN may return {"display", "draw", "render", "show", "view"} as candidates similar to the word "show". This step is meant to gather as many similar words as possible for each word entered by user 102 in language of desired communication.

The NN may be trained from a list of known verbs and nouns in a standard word dictionary 330, where each word is associated with all words that are considered similar to the word within a dictionary of language 1008 of desired communication.

Alternatively, a different word recognition method could be used, or one of a plurality of candidate words may be preferentially selected in accordance with a predetermined order, e.g., the first word processed. Other techniques in word recognition may be also employed for reasons such as better efficiency, but with the same goal implied in this step 1006.

At step 1010, each word in a preferred words glossary 1012 can be matched against the input word including any word W, or a plurality of words W, from the previous step 1006. A NN may be pre-trained using a list of words in a glossary of concepts 332, where each word is associated with all words that are considered similar to the word within a standard word dictionary 330, and within the subject domains of desired communication from the previous step 1006. The outcome of a NN may associate each matching word with all subjects in which the concept is used in the intents database 114. Subjects may include, but not limited to, Networks, Visualization, or Music.

This step is really about taking user input, recognizing concepts and mapping them to subjects. A glossary of concepts 332 ensures a shared vocabulary to facilitate communication, e.g., during problem solving or in a collaborative session in a project or task involving different application domains. Words in the glossary of concepts are, in fact, intent words 42 (see, again FIG. 4), that is, words constituting an intent.

At step 1014, it is checked whether the word W has a corresponding word in the glossary, i.e., an intent word 42. Specifically, the question is whether the input word "show" is itself an intent word 42 or, at the least, similar. In this example, the word "show" is not among words in the glossary of concepts 332—not explicitly declared as intent word.

If a corresponding intent word is found, the procedure continues to step 1016, otherwise the procedure proceeds to the step 1018.

At step 1016, the word is selected and placed as intent word in the analysis table 326. In the example, the intent word matching user input "show" is "display". So, "display" is set to be the intent word 42 corresponding to the input word 41 "show" in the analysis table 326; see again FIG. 4. The rest of the fields corresponding to the input word 41 "show" are then filled out; these are: meaning 44 (not shown in FIG. 4 for brevity); command word 45 as "displays"; index position in command 46 as 0, meaning the first word occurrence in the command text. These values are placed in the row of the input word 41 of the analysis table 326. At this point, the input word (i.e., "show" in the example), is marked as processed and is removed from the list of input words slated for recognition in subsequent steps. The procedure then continues to the next word recognition section in step 1020.

At step 1018, it is determined whether the input word is a noun or a verb even though the word is not recognized as a concept in the glossary of concepts 332. If so, the word W is added to the analysis table 326 anyway. However, all the fields for the row of the unrecognized input word are left empty, or labelled as "<undefined>", to distinguish them from the recognized input words. In the example, the input word 41 "me" is not among concepts and is therefore not an intent word. Accordingly, all the fields for this row are labelled "<undefined>" as depicted in FIG. 4. Otherwise, if the word W is neither a noun nor verb, the procedure continues to step 1020.

At step 1020, the next word recognition section is changed to the next value in the list of input words: {"show", "me", "connections", "network" }. The next word "me" is then set as the initial value for the next word recognition section.

At step 1022, it is checked if or not all input data 324 has been processed, i.e., whether all the words {"show", "me", "connections", "network" } have been analyzed. If not, the procedure proceeds to step 1106 to continue the next word recognition. Otherwise, the word recognition procedure terminates.

It should be observed in analysis table 326 in FIG. 4 that the fields of missing words 47 and excess words 48 are empty at this stage. Details of filling out these fields are discussed later using FIG. 11.

An artisan in the field will readily acknowledge that the above is a simplified illustrative example. Other methods of word recognition, such as bag-of-words model, could be used to fulfill the same goal of this procedure. Dynamic programming matching schemes or other methods may be also used.

Figure 11:
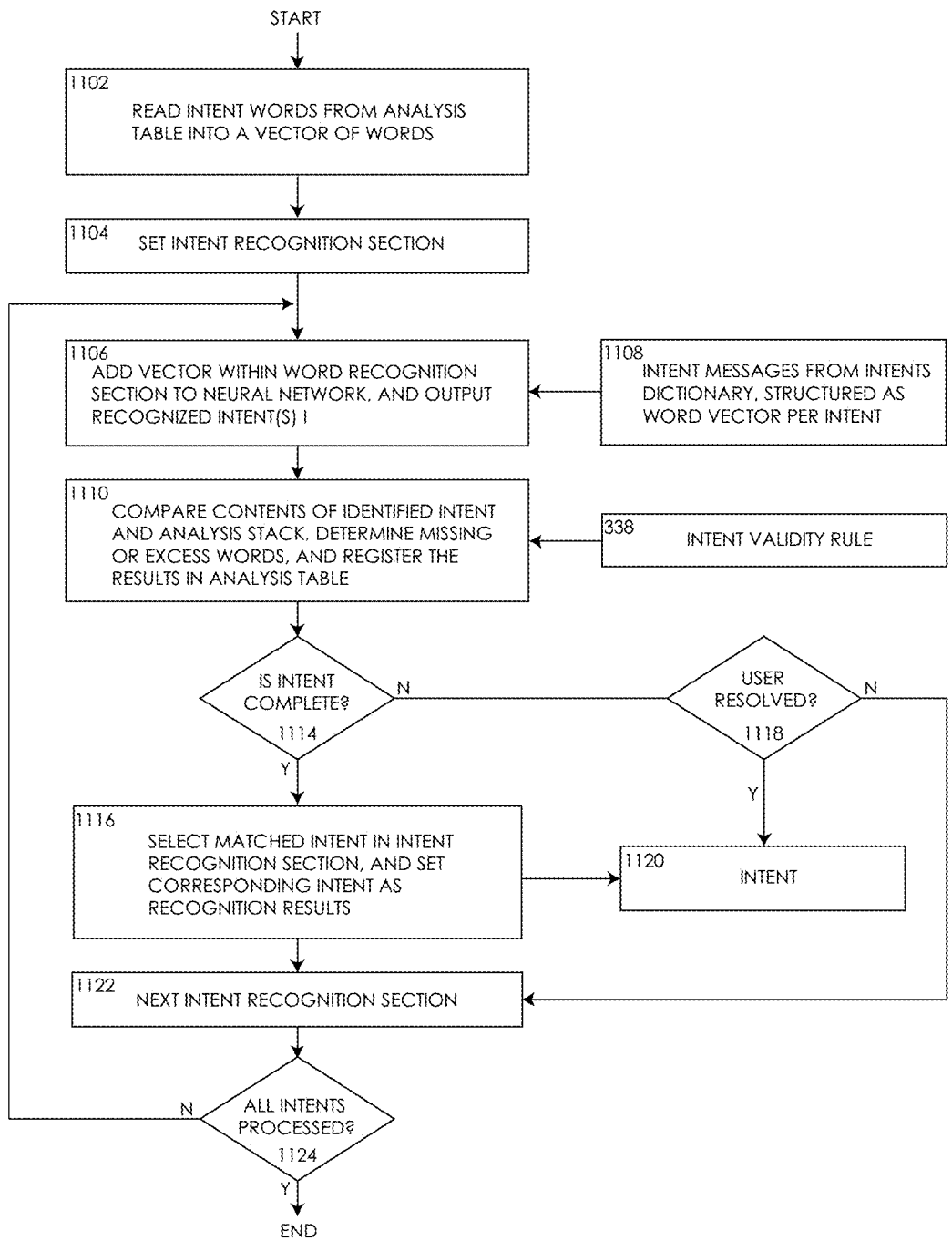
FIG. 11 is a flowchart of an intent analysis and validation procedure according to an illustrative aspect of the implementation.

In FIG. 11 is a simplified flowchart of an exemplary procedure used to fit an intent to both goal of user, and service provider capabilities (i.e., service goals). This procedure also determines missing words 47, or excess words 48 in the user's input data, and filling out these fields in analysis table 326 as illustrated in FIG. 4. The objective here is to complete intent recognition, and the module responsible for this procedure is the intent analysis & insight synthesis module 322.

At step 1102, intent words 42 are sequentially read from the analysis table 326, consistent with the ordering of the corresponding command words, and compiled into a word vector. In the example, the intent words vector from the previous step is ["display", "network", "connections" ]. As illustrated in FIG. 4, the position of each intent word 42 (mapped to the underlying command words 45) is also stored in a corresponding index vector, namely: [0, 6, 7]. The index vector defines the sequencing of the words vector. For example, "display" and "connections" identify with the position in command 45, as at 0 and 7, respectively.

Let us spend a bit more time clarifying positions in command. A word position in a command is readily deducible from a predefined intent. Consider, for example, a complete intent message from intents dictionary 336 illustrated using FIG. 7 for the Windows operating system command name 71 "netstat", quote: "Display protocol statistics and current TCP IP network connections; all connections and listening ports". The word "display" is at position 0 because index counting starts at 0, whereas the word "connections" is at position 7. Notice that index positions are a for convenience; other indexing conventions may be used, such as starting index counter at 1 instead of 0. The goal is provision for a way to track words with concepts when analyzing user input expressions.

According to the present implementation, each intent message 75 exclusively references a unique command option 73 and intent name 74 as shown in FIG. 7. The command name 71 "netstat" is a standard operating system command, which is part of, but not limited to, Windows and Linux platforms.

At step 1104, the initial word vector from the previous step 1102 is set in the intent recognition section, namely: ["display", "network", "connections" ].

At step 1106, the last vector from the intent recognition section is taken out and input to an already learned NN. The NN may be trained from intent messages 1108 in an intents dictionary 336, wherein each input word vector is associated with corresponding concepts in the intent. The NN then outputs each recognized intent along with its coincidence value S. The closer an input word vector matches an already learned intent, the larger the coincidence value is. This also accounts for multiplicity of each word, i.e., how many times each word from the input vector appears in an intent.

If multiple intents have the same coincidence value S, these intents may be output as a plurality of candidate intents. Take our input vector ["display", "network", "connections" ]. A NN may return all intents containing these words. Using FIG. 7 to illustrate, all the four intent names 74 {"NETSTAT_A", "NETSTAT_B", "NETSTAT_E", "NETSTAT_S" } would be produced as candidate intents along with their respective intent message 75.

At step 1110, contents of the identified intent(s) are analyzed. Each intent is compared with the input word vector to determine whether user input had missing or extra words relative to the predefined intent. On the one hand, a missing word is that word in the intent itself but not among intent words 41 in the analysis table 326; see, again FIG. 4 for reference. On the other hand, an excess word is an input word 41 in the analysis table 326 not required in the predefined intent itself. Details on determining the missing or excess words are discussed later using FIG. 12. Each recognized intent is validated against intent validity rule 338. Details on intent validation will be provided later using the flowchart in FIG. 13.

At step 1114, it is checked whether an intent is complete and valid. If so, the procedure continues to step 1116, otherwise it proceeds to step 1118.

At step 1116, the intent selected into the intent recognition section is the recognition result intent 1120, and the next intent recognition section 1122 is then set. Otherwise, if the intent is still incomplete, user 102 may be prompted to resolve by specifying an intent from a list of candidate intents presented in user interface 104.

At step 1118, it is checked whether user 102 specification resolves the intent. If so, the selected intent is added to the result intent 1120. If not, the candidate intent is discarded and the next intent recognition section 1122 is set, and procedure continues to the next step.

At step 1124, it is checked whether all intents have been processed. If so, the procedure terminates. If not, the procedure goes back to the earlier step 1106 and proceeds as discussed earlier. A complete intent will be explained later using FIG. 14.

Figures 12, 13:
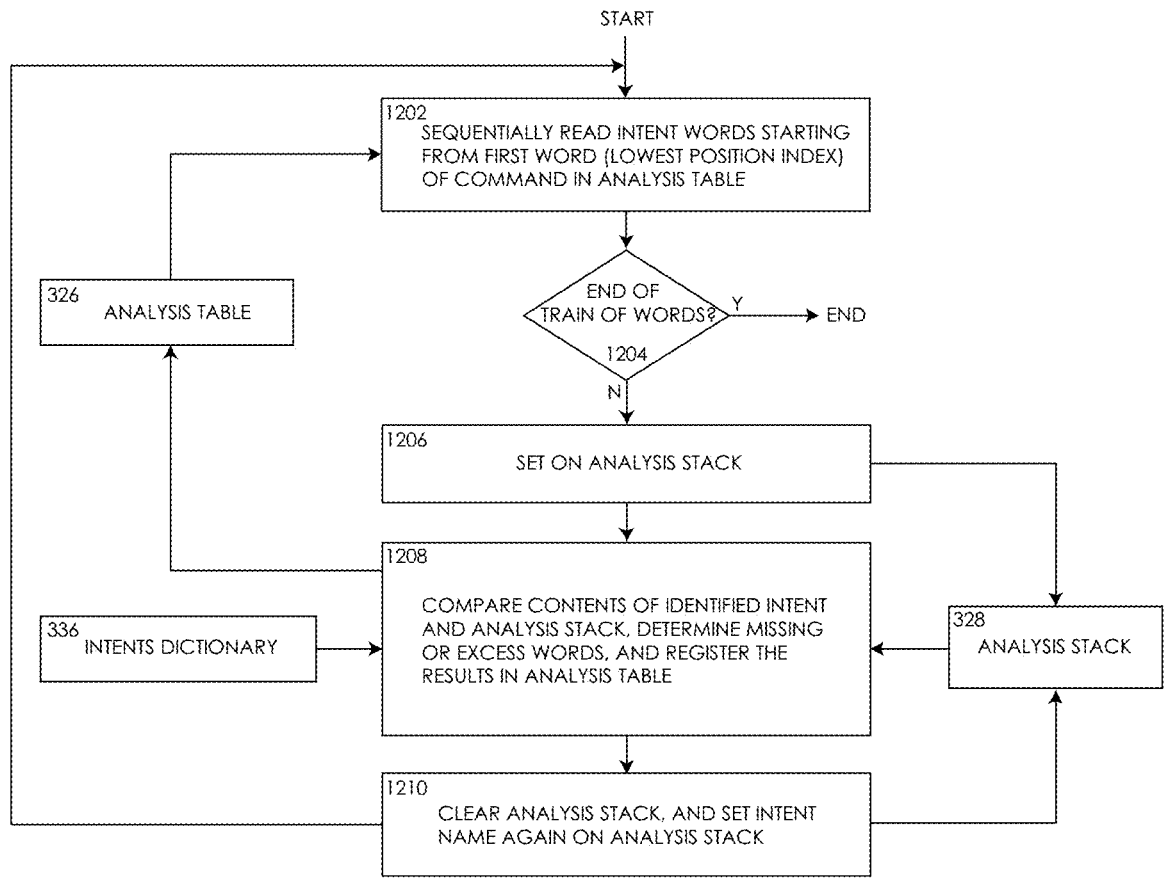
FIG. 12 is a flowchart of an illustrative procedure for determining missing and/or excess words in user input data according to an aspect of the implementation.
FIG. 13 is an illustrative intent validity rule according to an aspect of the implementation.

FIG. 12 is an exemplary procedure for determining missing or excess words in a user input with respect to a predefined intent. For each intent analyzed, missing words 47 and excess words 48 are stored in the analysis table 326.

At step 1202 (in FIG. 12), the intent words 48 in the analysis table 326 are sequentially read starting from the first word.

At step 1204, it is checked if there are no more words to process. If all words 49 (see again FIG. 4) are processed, the procedure terminates, otherwise continues to step 1206.

At step 1206, the input intent words 42 are set on the analysis stack 328 (FIG. 6). In the example, FIG. 6 illustrates the three intent words stacked up starting from the first concept 62 along with their corresponding index position in command 46. Specifically, the concepts are "display", "network", and "connections", and their corresponding position in command are 0, 6, and 7, respectively.

At step 1208, intents dictionary 336 is used to compare the intent against the words on the analysis stack 328 to determine missing words 47 and excess words 48. For illustration, reference is made to the analysis table 326 (FIG. 4), analysis stack 328 (FIG. 6), and intents dictionary 336 (FIG. 7). For the command name 71 "netstat" in FIG. 7 missing words 47 are {"protocol", "statistics", "current", "TCP", "IP", "all", "connections", "listening", "ports" }, as shown in the analysis table 326. Each word has a unique position in command 46: {1, 2, 3, 4, 5, 8, 9, 10, 11}, respectively. These are the words that, if included in the user input, would uniquely identify with one predefined intent in the intents dictionary 336. In some cases, excess words may be discovered in user input relative to an intent currently being analyzed. That situation, as previously discussed, would produce a plurality of intents for user to select one.

At step 1210, the processed intent words for the referred intent on the analysis stack 328 are cleared. The remaining words in the train 49 are then set on the analysis stack to continue identifying missing and/or excess words. Finally, all missing and excess words are set on the analysis table 326, as illustrated using the FIG. 4.

It is readily apparent to an artisan that the intents dictionary 336 depicted in FIG. 7 shows only a subset of the options in the operating system standard command "netstat" on, say, Linux or Windows. However, whereas this is for illustration purposes only, all the text descriptions shown in the FIG. 7 is a copy of the "netstat" command in Windows operating system. It is important to notice here that a similar command, but with different name, could be available on other platforms such as mobile phones, possibly with different sets of options. In that case, different intents would be available services capabilities on that operating system.

The goal of the implementation, by way of this example, is to use predefined commands to automatically generate explicit intents for integrating any operating system with an instance of a user companion system 112. Intents are critical because they communicate a concise problem understanding with its user on the one hand, but which is understood by user companion system consistent with the available services, on the other hand. Thus, by providing intents, the user companion system 112 empowers users 102 to search and/or discover precise intents in natural language, wherein each produced intent has an exclusive option in the referred command. For example, "netstat" command options, labelled as "NETSTAT_A" and "NETSTAT_S" in FIG. 7 are two unique intents corresponding to two options, respectively, "-a", and "-s" on the Windows operating system.

Unlike traditional command-lines requiring users to memorize the command options in coded form, such as "-a", which is often cognitively challenging for many users, the present implementation allows concept words in natural language that may be relatively easy for both casual and advanced users to remember. Use of features such as auto-completion can be leveraged for suggestions in real-time. However, whereas the example labels, for example "NETSTAT_A", are matched with the command option "-a", this is only for illustration. In reality, consistent names can be used based on functionality of the intent instead of "NETSTAT_A"; say, using one name that is semantically consistent across all operating systems.

Importantly, more than current command-lines and GUIs, each intent also provides additional information such as text, pictures, audio, and even sign language, as actionable insight to guide users to make informed decisions while solving problems. An expert in the field will readily recognize that this would also allow the service provider to deliver custom content, e.g., to integrate different variants of sign language, without need to rewrite the underlying user companion system 112. It is also an inclusive method that guides users to make choices that are critical to them with minimal biases predominant in many technologies employing AI alone.

Another important property is that any command or service API that is not defined in the services database 116 is treated as "undefined" or "unavailable". Since only intents with corresponding commands or service APIs are available to the user companion system 112, the user 102 is guaranteed to receive proven solutions for all intents produced in their user interface 104. In addition, the user 102 is notified very early about an unavailable service or capability, it may avoid waste of time way before the user 102 gets deeper into the request. In this regard, the present implementations can add the convenience of clearly setting user expectations. Experts in the art may likely identify other cases where users may be presented with alternative services in real-time based on a prevailing situation and context combined with user input for the kind of problem that is being solved.

Accordingly, the implementations enables to integrate natural languages in any software application program, in addition to operating systems, or devices that utilize a user interface, including virtual assistants. Different application domains, such as engineering, finance, shopping, music, route navigation, and so on, may integrate a user companion system 112 in their user interface 104. Integration may be achieved using service provider APIs 120 introduced earlier using FIG. 1. It is enough for the service provider to know service provider APIs and/or commands layouts, to register their service APIs with a services database 116. This process may be automated using API documentation tools for any environment such as desktop, web, Cloud, and mobile.

FIG. 13 illustrates intent validity rule 338 shown earlier in FIG. 9. A rule 131 comprises a condition of validity 132, and an action method 133. Given a set of intent words (concepts) from user input, it is checked whether an intent validity rule is satisfied. This will now be explained by using an example.

Consider the intent words 42 {"display", "network", "connections"}, introduced earlier, read from analysis table 326 for example. Using condition of validity 132 in FIG. 13, a valid intent can only have one verb 1321 and at least one noun 1322. The former is part of speech of action, whereas the latter defines part of speech of action specification. Also, per 1323 an intent may include "options" in addition to the "base statement", wherein a base statement identifies with a "family", and options specify the intent's "membership of the family". For instance, from the intents dictionary 336, illustrated in FIG. 7, four intent messages 75 are said to belong to one family, in which each intent exclusively corresponds to a unique option in the command name 71 "netstat". Referring to condition 1323 in FIG. 13, the base statement and option are separated by a semi-colon for illustration. One may easily notice consistency with, for instance, the intent name 74 "NETSTAT_A" from the intents dictionary 336 in FIG. 7: the base statement part is "Display protocol statistics and current TCP IP network connections", and the options part is "all components and listening ports".

Continuing with the intent validity rule 131 in FIG. 13, the action method 133 specifies the action to fulfill an intent. A getter 1331 action method only queries data without modifying it, whereas a setter 1332 action method modifies data to apply changes requested by the action. In the example, an intent may only specify one of the two: getter or setter. As per FIG. 13, a getter 1331 is a query verb that may be one of {"get", "read", "select", "display"}. The intent word 42 "display" corresponds to a getter in the rule, which tells a user companion system 112 that this request will only inquire data without modifying it. Expressed differently, it does not modify the state of the data on the computer system, or in the software application program.

FIG. 14 depicts an intent structure. It is the preferred frame-based concepts topology for associating a predefined command or provider API 120 from service provider operating system or software application program, respectively, with a predefined intent. Specifically, FIG. 14 is an exemplary intent 141 as a concept that is, itself, composed from concepts as defined earlier. In accordance with the implementation, object-oriented methodology is preferred wherein a concept is an object, which nests other objects within it uniquely characterizing it.

Since concepts can be nested, wherein one concept contains the other, a hierarchical structure can be described. As shown in the FIG. 14, intent 141 hosts the following concepts as direct child concepts: name 74, subject 53, base message 142, options message 143, data table 144, and provider command/service API 120. Furthermore, the data table 144 has direct children: input word 41, intent word 42, part of speech 52, command word 45, position in command 46, word meaning 44, and actionable insights 76 for the intent.

It is important to remember here that the intent-frame illustrated in FIG. 14 is the final result from all the program modules, methods and system discussed this far. In short, the intent-frame is the single source of truth for an intent with references to all the necessary information on the defining concepts, facts, and situation pertaining to the goal of the intent, and the service that the intent needs to deliver to fulfill this goal. It is content from this data structure that a user companion system 112 uses to communicate with user 102 in user interface 104, on the one hand, and with service provider services through the APIs 120, on the other hand.

Each intent-frame contains a set of concepts on a subject, topic or category defined in part by a topical attribute, which may be inferred from the name of the concept. For example, name 74 "NETSTAT_A" within intent 141 addresses a name for the intent itself. Accordingly, the command 120 is bound to this same intent in memory. Also, name 71 is nested within provider command/service API 120, which is in turn nested in intent. Thus, name 71 and name 74 may not be confused as they are at different levels in concept hierarchy. Specifically, because of object-orientation for intent-frame, command/service API 120 name 71 and intent name 74 are unique memory areas and would not be in conflict for using the same label "name".

It is also worth noticing that intent-frame can store actionable insights 76. The insights storage area can be used to provide comprehensive, domain-specific information, which can aid a user's cognition abilities when interpreting the meaning of the intent. As defined earlier, the information includes sign language, besides other context-specific content such as pictures, text, videos, etc. Artisans in the field will readily determine that actionable insights may encompass, without limitation to, evidence-based visual content, question answering as well as storytelling.

An intent is meant to communicate a specific problem understanding and subject, in order to align both user goal and system goal (capabilities). Because an intent is itself a concept (idea or thing), as defined earlier, it enables concept-driven conversations between users and computers, or between users communicating via a computer system. Even more important is that the intent 141 in the implementation is preferred to be scalable and dynamic. This is motivated by the need to extend the traditional commands and/or service provider APIs with actionable insights, and which must be customizable to specific problems, fields of application, or even other languages than English. As an example, it has been described how the implementations could be applied to CAD systems. This generally represents an example of integrating a vendor computer software program via service provider APIs. In another example, it has been described how to extend operating systems with a user companion system to support natural languages using intents in the present implementations.

Those familiar with the art may observe that the implementations can be universally applied to any predefined command, or API, in service provider systems, regardless of device or computer system. This can generally enable any computer system with predefined commands or APIs to integrate sign language in their user interfaces, such as in virtual assistants or conversational user interfaces. Because the commands and service APIs are predefined, it is possible to pre-record sign language videos to make present computer systems communication more inclusive of, say, auditory-impaired individuals.

It may be apparent by now to the reader that each intent has a corresponding provider command or service API. While intents are stored in intents database, provider commands and service APIs are stored in services database as service APIs. This architecture enables the user companion system to provide uniform access to the otherwise disparate provider services. For example, it allows provider services to be categorized by, say, domain of application (field or subject or category), or operating system. A service API is either a command (operating system), or provider service API (software program) in the provider computer system. A services database can be automatically populated from any registered service provider application API, or operating system commands, or other APIs in general. For smaller applications, a manual service API population process is also feasible. Also, intents may be automatically generated—from the command using the word & concept recognition module 318, and intent analysis & insight module 322 discussed earlier and stored in intents database 114—since they are known. Additional user-guiding information could be then added to the intent insights 76 store using various known technologies in the art, e.g., through a user interface.

As the concept-driven organizational structure of intent 141 used herein is scalable, it can be implemented to organize larger numbers of messages within subjects of communication. The process may be automated using known methods, such as AI and ML. This concept-driven intent definition also enables iterative communication of constantly pulling apart concepts during intent analysis, putting them back together to fit user and system goals, re-applying them to alternative or related situations, building new intents, finding ways to clarify ambiguities and correcting misconceptions through actionable insights, thereby effectively enabling the user to create meaning in their own way. This topology is preferred to provide dynamic frame-based intents for computer systems according to implementations.

Returning to FIG. 14, the process of specifying an intent is a conversation between a user 102, or a plurality of users, and user companion system 112. The user companion system 112 may prompt user with alternative concept(s) to navigate and/or confirm. As each concept may have actionable insights associated, e.g., pictures or sign language, the user is better placed to make informed decisions and upfront expectations. In some cases, user may need to specify an intent out of a plurality of intents produced by the user companion system. The said intents are presented to user, in the user interface, for purpose of communication. In other cases, user may cancel a request at any time and the user companion system gracefully ends the prevailing activity as requested by the user.

If the user confirms an intent, as indicated in FIG. 9, the intent may trigger an action for user companion system 112 to fulfill the intent goal. Valid intents are served by intent processing module 118. Intent processing module will be discussed later using FIG. 15.

Figure 15:
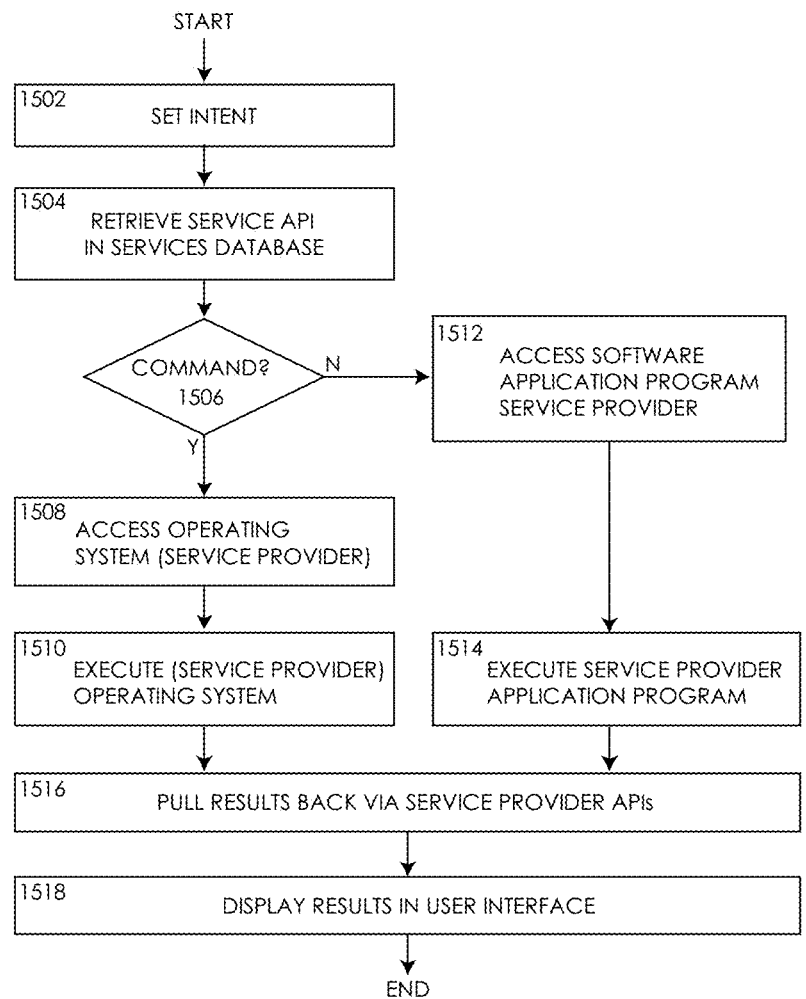
FIG. 15 is a flowchart of an exemplary procedure for executing an intent in accordance with a preferred implementation.

FIG. 15 is an illustrative flowchart of a method for executing an intent in accordance with an aspect of the implementation. Once user specifies an intent in user interface, intent can be executed by intent processing module 118 to fulfill user's goal.

At step 1502, the user specified intent is set.

At step 1504, the service API for the intent is retrieved from a service database.

At step 1506, it is checked whether the service API is associated with a command. If so, then the intent is an operating system request, and the procedure continues to step 1508. If not, then this is a service provider API and, thus, it is a software program request—procedure continues to step 1512.

At step 1508, the service provider operating system is accessed. At step 1510 the service provider command is executed on the operating system.

At step 1512 the specified software application program on a service provider computer system is accessed. At step 1514, the service provider API is executed on the target software application program.

At step 1516, user companion system pulls the results back from services provider system via the service provider APIs.

At step 1518, the results from step 1516 are displayed in a user interface to user.

Those skilled in the field will recognize that in typical real-world scenarios, several iterations may occur where user may specify multiple intents, which can invoke a plurality of programs from a plurality of application domains, e.g., from engineering and financial fields.

A user companion system, in accordance with the present implementations, may be implemented on a data processing device such as, but not limited to, desktop, web, mobile, or cloud computer system. In general terms, such a system will include a user interface and intent, which specifies messages and predefined relations between intents and their associated command or service API from a service provider, or a plurality of service providers.

Example 5: Sign Language Animation Video Integration

It will be apparent to those skilled in the art that a human signer translating text or audio into sign language may be recorded to a video using various different methods and utilities, e.g., camera. Video format can vary, and is often dependent on the recording device. For example, video cameras usually produce AVI, MP4, or OGG format. Other techniques may be also used for motion-capture. Whereas some techniques are direct recordings of signer, other techniques may use sophisticated methods attaching sensors to the signer.

Regardless of the method used to produce a video, pre-recorded video clips of a signer can be created from pre-defined intent message text by having a human signer translating that text, or audio thereof, in the intent to a sign language video animation. As discussed earlier using FIG. 2, text produced by user companion system may be an intent message, a concept description, a prompt, or other output.

In order to accurately capture meaning and context, it is preferred in the present implementations to involve domain experts in subjects of communication. Accordingly, engaging Deaf, or auditory-impaired, communities is essential at every level of communication. In order to provide a user companion system that actually meets user needs, is usable, and facilitates adoption of the technology, it is preferred to provide various means of communication, e.g., sign language, text, picture and audio, whenever a situation needs actionable insights.

Figure 16:
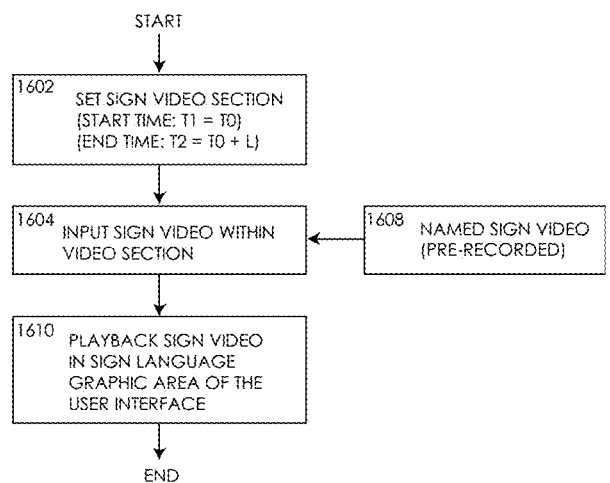
FIG. 16 is a flowchart of an exemplary procedure for displaying a sign language in accordance with a preferred implementation.

In sign language, a sentence is generally expressed by a series of hand, finger, etc., movements. In the embodiment, a video of sign language animation of a predefined intent message is stored as a named sign video, which belongs to the insights area of the intent. Animation videos are prerecorded and associated, by name and storage location, with the intent. It will be apparent to the artisan in the art that this is possible even without using complicated methods, such as NN, because the videos used herein are based on predefined messages in the corresponding intents. Design of the exemplary sign language video display procedure will be now given using the flowchart FIG. 16.

At step 1602, an initial value of a sign language video section is set. As the initial value, a start time of the sign video section T1 is set to time T0, and the end time of the sign video section T2 is set to time T0+L, wherein L is the total duration of the video clip.

At step 1604, the prerecorded sign language video 1608 linked to the intent message is loaded into memory, with a playback duration adjusted to fit within the predefined video section, that is, between T1 and T2. Alternatively, a different time setting may be used, e.g., based on duration of audio produced from reading the intent message text. Generally, clips are already prerecorded to the right duration since the messages are already known. However, a user may want to configure durations to fit their specific needs. In this case, a sign language video may be configured by the user, say, using the help area of the user interface, or even using other means.

At step 1610, the sign language animation video in memory is played back in the sign language graphic window of the user interface, as discussed earlier.

As alternate example method of sign language video playback, AI techniques could be used to teach a NN the intent message along with the associated video, or a plurality of videos. In some cases, instead of video, a series of pictures could be used to describe frames of signs. In other cases, a word may be expressed by a series of hand and/or finger motions, and a sentence may be expressed by a train of words.

Furthermore, a choice can be made whether to present to user a real human face in the sign language video animation playback, or to use other advanced techniques of generating, say, an avatar in place of a human signer. Such decisions could be influence by privacy needs.

According to an aspect of the implementations, the additional information that each intent associates itself with (in the intents database) is generally a preferred extension of descriptions provided by the service provider APIs, or commands (in the services database). While, traditionally, service provider command or API descriptions are hardcoded by the service providers, and hence are predominantly static, an intent in the present implementations can provide dynamic insight content based on situations and subjects of communication. Accordingly, succinct sign language animation videos could be displayed to users per context.

Also, because sign language videos are loaded into memory by name, a variant of sign language, e.g., Chinese vs American Sign Language, can be readily introduced by replacing the target video in the user companion system media store without making any change to the system. Alternatively, a simple configuration change to reference a different store, say, Chinese media store, is as well apparent to those skilled in the art.

Sign language animation videos may be uploaded and stored within the network, or remotely such as private network storage. This would facilitate, not only management of sign-language videos, but could also facilitate a means for auditory-impaired individuals to actively collaborate amongst themselves as well as with any other non-impaired user.

Figure 17:
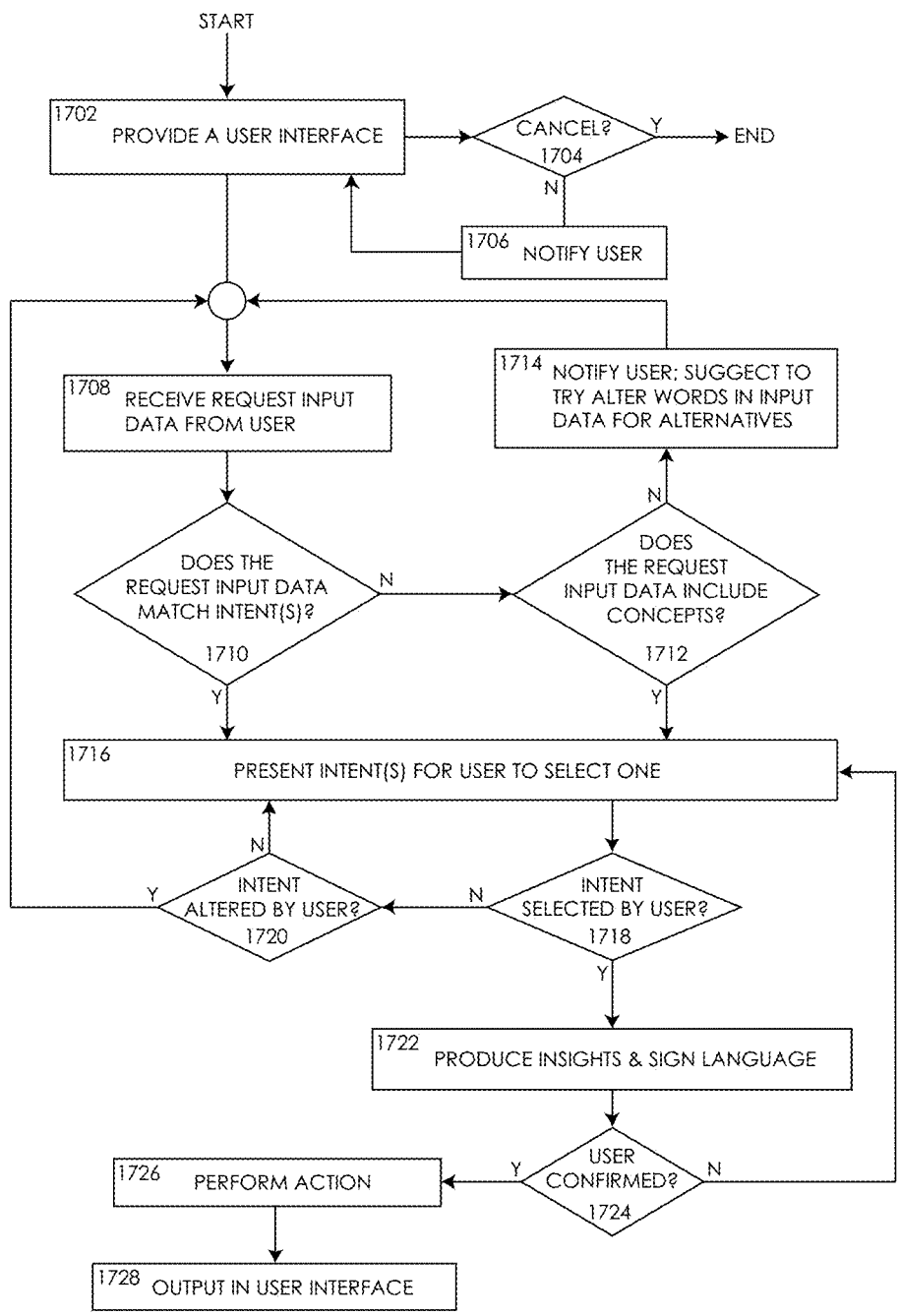
FIG. 17 is a typographical illustration of providing sign language to a user in a system with a user interface integrates a user companion system in accordance with an implementation.

Example 6: Method of Providing Sign Language in a User Interface Integrating with a User Companion System FIG. 17 is an example method for providing sign language to a user in a computer system with a user interface integrating a user companion system according to an implementation.

At step 1702, user companion system provides a user interface to a user. The user interface includes various elements such as editor area, prompt area, sign language viewer, help area, and so on, such as illustrated earlier using FIG. 2.

At step 1704, at any point during interaction with the user companion system, an operation can be gracefully terminated if user decides to cancel an activity. At step 1706, user is notified about the status of the termination when the user cancels the said operation.

At step 1708, the user companion system receives input data from user. In some cases, the user companion system receives an intent message, or a plurality of intent messages, of a predefined subject of desired communication via user interface. In other cases, user companion system receives words from the user via the user interface.

At step 1710, user companion system determines whether input data matches intent, or a plurality of intents, in an intents database. If no matching intent is found, procedure advances to step 1712.

In some cases, user input exactly matches one predefined intent. In this case, user companion system produces one intent. In other cases, however, user input data may cause a plurality of intents to be produced by the user companion system. For example, the user may have entered a set of words that do not uniquely describe an intent. The procedure continues to step 1716.

At step 1712, it is checked whether concepts were recognized among the words input by the user, since no unique intent was determined in the preceding step. If no concept was recognized, the user is notified. The user may alter words in the input data (at step 1714) and may receive a different set of predefined intents based on the revised specification. If yes, the user may then review the produced intent(s).

At step 1716, the user companion system presents to the user, in user interface, the list of intents produced in the preceding step. Each intent presented may include actionable insights specific to the intent, such as sign language, pictures, text, video, audio, etc., for user to better interpret the intent purpose.

At step 1718, the user may select one intent from the list of predefined intents provided by the user companion system. If one intent is selected, the procedure advances to step 1722. If not, then the procedure continues to step 1720.

At step 1720, it is checked whether the user altered a predefined intent instead of selecting to use one from the list. If yes, the procedure returns to step 1708, otherwise returns to step 1716 to allow the user to continue to review the intents in the list.

At step 1722, the user companion system produces insights associated with the intent in the user interface, which include sign language providing the meaning of the intent. In addition to the sign language, other information may include text, pictures, videos, audio, etc., as discussed earlier. The user may navigate to review a different intent as needed.

At step 1724, the user companion system may prompt the user to confirm intent. If user does not confirm, the procedure returns to step 1716 where the user can continue to review the list of presented intents. Otherwise, if the user confirms the selected intent, the user companion system is ready to execute on the intent request.

At step 1726, the user companion system performs the action associated with the intent in to fulfill the goal. Upon completion of this action, the user companion system may display the output in the user interface.

At step 1728, results of the action performed by the user companion system are output and displayed to the user in the user interface.

Example 7: User interface on mobile devices

Figure 18:
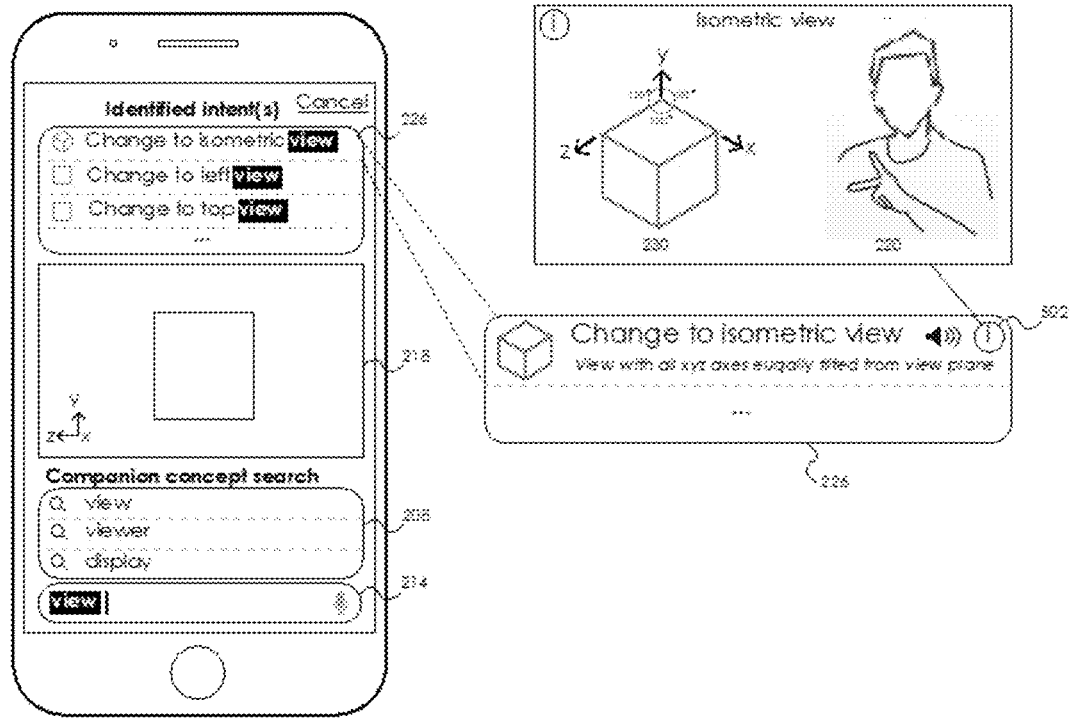
FIG. 18 is an exemplary user interface for dynamically providing predefined intents with sign language, on a device with a user interface, according to an aspect of the implementation.

FIG. 18 provides an exemplary user interface for dynamically providing predefined intents to a user on mobile devices, according to an implementation. As discussed earlier, user interface provided to user includes various elements such as help area 208, editor area 214, graphic view area 218, sign language viewer 220, prompt area 226, and graphic help area 230. In some cases, the elements in the user interface may be displayed in a different format, e.g., different placements, shapes and sizes; text, font, and so on.

The editor area 214 is a text box for user input. It can also include the option for audio input indicted by a microphone icon in the illustrative FIG. 18. By way of example, user has entered the text "view" in the editor area 214. As user types the word, user companion system 112 suggests words in the help area 208, that closely match user's input. In the example, the words {"view", "viewer", "display" } are shown for illustration purposes. It is worth mentioning here that the list suggested in the help area 208 is constrained to the subject of communication (domain language) vocabulary in the glossary of concepts. This is vital to providing user with concise terms that are unambiguous and ubiquitous to the application domain, or subject of communication.

In analyzing user input, user companion system finds a few candidate intents based on what it determines are the likely user goals based on the user input. The messages are presented in the prompt area 226. Here, only three intent messages are shown for illustration purposes, namely {"Change to isometric view", "Change to left view", "Change to top view" }based on the candidate matches to the user input text "view".

In some implementations, for each intent that a user navigates, a series of sign language animations may be presented in sign language window 220 for the intent. For instance, each intent within the prompt area 226 may be highlighted one at a time, such as by highlighting an intent, while an animation is presented for the intent.

The user may navigate the different intents to preview actionable insights as needed. For example, navigating to "Change to isometric view" presents text describing the intent itself in the prompt area 226: "View with all xyz axes equally tilted from view plane"—shown as zoomed in only for better reading in the illustration. Additionally, illustrated on the left side next to the intent message is a picture of the expected outcome (here, view orientation) included to give user insight into the intent, that is, the result orientation of the graphic 3D view. Also, user may enable audio to read aloud the text in the prompt area 226 to user. In some cases, user may want to further explore insights 502. In the example, a detailed picture is displayed in the graphics help area 230, depicting a sufficiently detailed image of the expected outcome consistent with the intent description. But there is also a sign language viewer 220 in which the signer video, associated with the intent, is presented. User may select the sign language of choice, e.g., Chinese or American Sign Language.

In other implementations, sign language may be placed in other locations of the display area, such as an overlay on the graphics view 218. However, a different placement and/or sign language window size can be also configured by user. Other options already known in the art of mobile technology, such as projecting onto larger displays such as television screen, can be used.

Once satisfied with the selected intent, user may confirm to specify the intent, which effectively executes to fulfill user's goal, as explained earlier.

Figure 19:
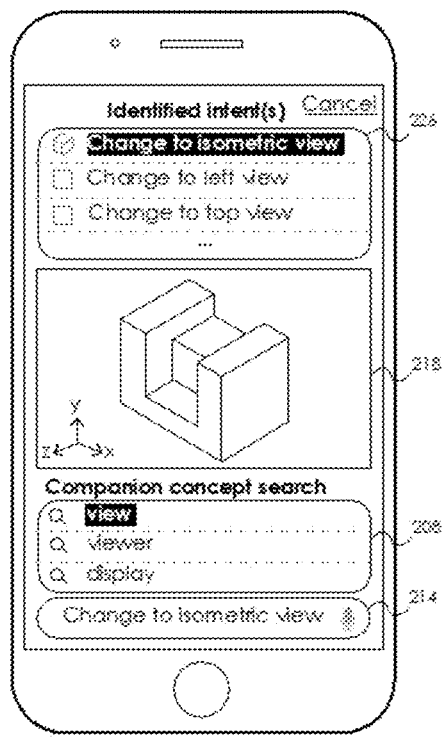
FIG. 19 is an exemplary user interface illustrating user selection of a predefined intent in accordance with an aspect of the implementation.

FIG. 19 illustrates a situation where user selects intent message "Change to isometric view", as shown in the prompt area 226. The help area 208 now indicates the search word "view" used. Accordingly, user companion system replaces the text in editor area 214 with the message in the specified intent.

In certain cases, user may alter the words in editor area 214. Responsive to such input, user companion system according to the present implementation may provide user with a set of matching predefined intent messages, based on the revised specification.

Finally, the outcome desired by user is displayed in the graphic view. In the example, the 3D model is re-oriented to isometric view as requested by user. Artisans in the field will readily recognize that isometric view is one of many possible ways to position viewer relative to 3D objects in a scene projected into the computer screen.

It will be apparent to those skilled in the art that the above is a simplified example for illustration purposes only. Various different requests of varied complexity are possible by importing service provider commands or service APIs in the services database of the user companion system. In addition, various different services may be introduced without having to re-write user companion system or service provider systems (i.e., operating systems or software application programs). Instead, only service provider APIs in the services database way be extended and scaled as needed.

The present implementation is independent of the application domain, e.g., engineering or financial. Depending on the language of the words that user enters as input, intents may be retrieved without limitation to domain, e.g., mechanical engineering, finance, or music. Since intents are predefined, capabilities of user companion system are only limited by the available services from service providers. Crucial is the fact that, by fitting user input to predefined intent, user companion system effectively fits user's goal to available system capabilities, with the guarantee that a corresponding service is always available in the services database.

Having predefined intents allows to deliver user companion system with predetermined sign language content, and which may be customized based on the preferred sign language. Crucially, since an intent in the present implementations essentially represents a concise problem understanding of user's need, a user is empowered to specify requirements for services that are available and probably already proven. This increases productivity and efficiency in problem solving because the options available to user are reliable and could be proven to work.

Accordingly, as described herein, a system and method are presented for a user companion system to facilitate communication between humans and computers, as well as between humans using computers, regardless of whether the user is auditory-impaired. The user companion system delivers sophisticated user interface that includes several communication elements with extensions that promote inclusivity of the deaf and auditory-impaired users. Other disabilities can also be supported, e.g., dyslexia, by using the recommended fonts for text in user interface.

As the user companion system is based on standard commands and predefined provider service APIs, it is feasible to tailor the messages and insights, including sign language, to specific communities with specific needs and specific fields of applications, or application domains. Besides, by affording service providers (for operating systems, and any software application program), the user companion system is independent of the application environment or type, e.g., desktop, mobile, cloud, and so on. Key to the implementation is the shared language in particular domains, with the complimentary strength of the concept-driven communication methods.

By using concepts to delimit and integrate various application domains using glossary and nomenclature, as well as using a concept as the foundational unit of knowledge in the present implementation, intents based on concepts can be used to build complex systems. In real-life, humans do reason around concepts: ideas or things. However, the interpretation of each concept depends, not only on the situation, but also on the experience and exposure the user has. This means different users would otherwise interpret an intent differently based on their experience or situation. It is for this reason that the implementation provides contextual information in the form of actionable insights in order to ensure the user makes informed decisions by reviewing the intent before confirming their selection. This is important to provide users clear and consistent expectations regardless of the service provider system that a user companion system uses to solve a user's problem.

Since, according to the present in implementations, a concept can be recursive as a system it does not matter whether a concept is a thing (tangible) or idea (intangible). What really matters is the attributes or user preferences the concept associates itself with because these are the properties that characterize the concept. For example, whereas a car is generally a concept according to the implementations, the number of doors could differentiate one car model or type from the other. This could be a very valuable contribution in the implementations because a concept may become a true bridge between the real-world and the virtual-world, and could enable iterative communication of constantly pulling apart ideas or things, putting them back together, re-applying them to different situations, figuring ways to clarify misunderstandings via those actionable insights in natural language and enabling every user, with their own disabilities or not, to derive meaning in their own ways thereby making the users of the user companion system better versions of themselves. This is the premise by which the user companion system is invented.

It is valued that certain features of the implementations, which are, for clarity, described in the context of distinct embodiments, may also be provided in combination in a single embodiment. Equally, several features of the implementations, which are, for brevity, described in the context of a single embodiment, may also be provided separately or in any suitable sub-combination or as suitable in any other described embodiment. Some of the features described in the context of various embodiments are not to be considered essential features of those embodiments, unless the embodiment is defective without those elements.

What is claimed is:

1. A method for providing augmentative communication comprising:
    using one or more processors:
    providing a user interface to a user;
    receiving input data from the user;
    determining whether the input data matches any concepts in a predefined intent stored in an intents database for responding to the user;
    if the input data matches, identifying a predefined intent having a predefined association with a predefined command or service application programming interface (API), from a service provider computer system, for a predefined subject of communication;
    providing an intent, or a plurality of intents, to the user on the user interface for the user to select or to preview insights associated with the predefined intent or other intents in the intents database before the user confirms the intent for execution as a confirmed intent;
    displaying sign language and providing additional information that includes actionable insights on the intent or plurality of intents to enable the user to confirm the intent or one of the plurality of intents for execution as a confirmed intent;
    receiving a confirmation of the confirmed intent from the user using the user interface;
    executing the confirmed intent by performing the corresponding action to fulfill the user's goal;
    displaying results of the corresponding action in the user interface to the user,
    receiving a request from the user to cancel an activity;
    terminating the corresponding action anytime in response to the user requesting canceling the corresponding action in the user interface; and
    notifying the user about a status of the request by sending a message to the user interface.

2. The method according to claim 1, wherein each predefined intent comprises:
    one verb pertaining to an action type that the user wants performed;
    at least one predefined concept, wherein a concept is a noun in a computing system pertaining to an idea or thing in the real-world within a subject of communication;
    a set of predefined concepts and each said concept is persistently stored in a glossary of concepts;
    a nomenclature of concepts pertaining to the intent in the glossary of concepts, within which each concept has a unique meaning within the context of the intent; and
    actionable insights contained in each concept for purposes of clarifying to a user the concept through context-specific content, such as pictures, videos, text, and sign language.

3. The method according to claim 1, further comprising:
    determining the input data does not unequivocally match a predefined intent stored in the intents database;
    determining the input data, however, includes words matching concepts in a glossary of concepts in any predefined intent stored in the intents database;
    notifying the user, in the user interface, that no intent has been found to match the input data; and
    receiving a revised specification from the user comprising altered words in the said input data to replace a word or plurality of words of the input data.

4. The method of claim 1, wherein the user interface integrates a user companion system for providing predefined intents and displaying sign language to the user and the method further comprises:

receiving input data from the user in a text editor area of the user companion system;

providing visual translation of the content of the confirmed intent or any concept requested by the user using sign language in a sign language viewer portion of the user companion system;

providing text output in a help area of the user companion system suggesting word spelling, constrained to concepts in a glossary of concepts, as the user inputs words at runtime;

providing a set of matching intents having predefined association with one concept or plurality of concepts recognized from user input data in a user prompt area of the user companion system;

providing optional audio output through reading out loud the text in the user prompt area;

providing a picture, or plurality of pictures, corresponding to the confirmed intent or a concept specified by the user for preview in a graphic help area of the user companion system; and providing a graphic view, for computer graphics application domains, in a graphic view area of the user companion system.

5. The method of claim 4, further comprising:

suggesting, in the user interface, based on the input data and context, words constrained to a predefined glossary of concepts within subjects of services available from service providers from a services database;

providing a sign language interpretation for a predefined concept or intent within a predefined subject of communication presented to the user in the user companion system of the user interface.

6. The method according to claim 5, further comprising receiving revised data input data from the user in the user interface and further comprising:

determining an alternative set of substitution concepts having a predefined association with a predefined intent or subject and the said revised input data in the help area of the user companion system;

determining alternative intents having a predefined association with concepts in the revised input in the help area of the user companion system.

7. The method according to claim 1, further comprising:

receiving input data from the user to replace a word, or a plurality of the words, of the confirmed intent;

if the confirmed intent is a predefined intent, altering the message of the predefined intent using the input data;

receiving input data from the user that includes a revised intent message of words in the predefined intent; and determining a set of substitution concepts having a predefined association with the predefined intent.

8. The method of claim 1, wherein the predefined intent has a predefined communication frame for a predefined subject of communication and the method further comprises:

providing the predefined communication frame of the predetermined intent, the predefined communication frame comprising a command used to instruct an operating system to perform a specific task to fulfill the said predetermined intent; or providing a service API used to instruct a software application program to perform a requested action to fulfill the predetermined intent.

9. The method according to claim 1, wherein receiving input data from the user further comprises prompting the user to confirm a confirmed intent and the user interface further includes additional information with actionable insights such as sign language, text, pictures, videos, audio, as needed, based on the subject of communication, context and situation, and where the method further comprises:

prompting the user to confirm the confirmed intent includes executing an action according to a specification of the confirmed intent, in a service provider computing system, and returning results to a user companion system;

displaying to the user, in the user interface, results of the action execution.

10. The method of claim 1, further comprising wherein the user communicates with a computer in natural language to execute commands on an operating system, or to execute an API request on one of a software application program, a plurality of operating systems, or software application programs, independent of the application domain with precise sign language presentation, in the user interface.

11. A system for providing augmentative communication comprising:

a processor;

a memory operatively coupled with the processor, the memory comprising computer readable instructions which when executed by the processor perform a method comprising:

providing a user interface to a user;

receiving input data from the user;

determining whether the input data matches any concepts in a predefined association with a predefined command or service application programming interface (API), from a service provider computer system, for a predefined subject of communication;

if the input data matches, identifying a predefined intent having a predefined association with the predefined command or service API, from the service provider computer system, for the predefined subject of communication;

providing an intent, or—a plurality of intents, to the user on the user interface for the user for the user to select or to preview insights associated with the predefined intent or other intents in an intents database before the user confirms the intent for execution as a confirmed intent;

displaying sign language and providing additional information that includes actionable insights on the confirmed intent to enable the user to confirm the intent or plurality of intents as the confirmed intent using the user interface;

executing the confirmed intent by performing the corresponding action to fulfill the user's goal;

and displaying results of the corresponding action in the user interface for the user and receiving a request from the user to cancel an activity;

terminating the corresponding action anytime in response to the user requesting canceling the corresponding action using the user interface; and notifying the user about a status of the request by sending a message to the user interface.

12. The system of claim 11, wherein additional information comprises one or more of subject specific predefined intents.

13. The system according to claim 12, wherein each predefined intent comprises:

one verb pertaining to an action type to be performed;

at least one predefined concept within a subject of communication;

a set of predefined concepts where each predefined concept is persistently stored in a glossary of concepts;

a nomenclature of concepts pertaining to the predefined intent in the glossary of concepts, within which each concept has a unique meaning within a context of the predefined intent; and actionable insights contained in each predefined concept for purposes of clarifying to a user the predefined concept through context-specific content including pictures, videos, text, and sign language.

14. The system according to claim 11, wherein the method further comprises:

determining the input data does not unequivocally match a predefined intent stored in the intents database;

determining the input data, however, includes words matching concepts in a glossary of concepts in any predefined intent stored in the intents database;

notifying the user, in the user interface, that no intent has been found to match the said input data; and receiving a revised specification from the user comprising altered words in the said input data to replace a word or plurality of words of the input data.

15. The system of claim 11, wherein the user interface integrates a user companion system for providing predefined intents and displaying sign language to the user and the method further comprises:

receiving input data from the user in a text editor area of the said system user interface;

providing visual translation of the content of the confirmed intent or any concept requested by the user using sign language in a sign language viewer portion of the user companion system;

providing text output in a help area of the user companion system suggesting word spelling, constrained to concepts in a glossary of concepts, as the user inputs words at runtime;

providing a set of matching intents having predefined association with one concept or a plurality of concepts recognized from user input data in a user prompt area of the user companion system;

providing optional audio output through reading out loud the text in the prompt area of the user companion system;

providing a picture, or plurality of pictures, corresponding to the confirmed intent or a concept specified by the user for preview in a graphic help area of the user companion system;

providing a graphic view, for computer graphics application domains, in a graphic view area of the user companion system.

16. The system of claim 15 wherein the method further comprises:

a. suggesting, in the user interface, based on the input data and context, words constrained to a predefined glossary of concepts within subjects of services available from service providers from a services database;

b. providing a sign language interpretation for a predefined concept or intent within a predefined subject of communication presented to the user in the user companion system of the user interface.

17. The system according to claim 16 wherein the method further comprises receiving the revised data input data from the user in the user interface of the said system and the method further comprises:

determining an alternative set of substitution concepts having a predefined association with the a predefined intent or subject and the revised input data in the help area of the user companion interface;

determining alternative intents having a predefined association with concepts in the revised input in the help area of the user companion interface.

18. The system according to claim 11 wherein the method further comprises:

receiving input data from the user to replace a word, or a plurality of the words, of the confirmed intent;

if the confirmed intent is a predefined intent, altering the message of the predefined intent using the input data;

receiving input data from the user that includes a revised intent message of words in the predefined intent; and determining a set of substitution concepts having a predefined association with the predefined intent.

19. The system of claim 11, wherein the predefined intent a predefined communication frame for a predefined subject of communication, and the method further comprises:

providing the predefined communication frame of the predetermined intent, the predefined communication frame comprising a command used to instruct an operating system to perform a specific task to fulfill the intent; or providing a service API used to instruct a software application program to perform a requested action to fulfill the predetermined intent.

20. The system according to claim 11, wherein receiving input data from the user further comprises prompting the user to confirm a confirmed intent and the user interface further includes additional information with actionable insights such as sign language, text, pictures, videos, audio, as needed, based on the subject of communication, context and situation, and where the method further comprises:

prompting the user to confirm the confirmed intent includes executing an action according to a specification of the confirmed intent, in a service provider computing system, and returning results to a user companion system;

displaying to the user, in the user interface, results of the action execution.

21. The system of claim 11, wherein the method further comprises where the user communicates with a computer in natural language to execute commands on an operating system, or to execute an API request on one of a software application program, a plurality of operating systems, or software application programs, independent of the application domain with precise sign language presentation, in the user interface.

22. A method comprising:

using one or more processors, generating a user interface comprising a user companion system, the one or more processors configured by machine readable instructions to:

receive an indication that the user interface comprising the user companion system has received input data from the user in the user interface;

determine, using a set of words in the input data, a group of similar commands or APIs stored in a services database which includes services from service provider APIs; and identify an intent from a set of services or capabilities, the intent corresponding with the group of similar commands or APIs.

23. The method according to claim 22, wherein the indication is based on concepts recognized from user input and correspondence values matched against previously learnt intent messages using one of neural networks or machine learning systems.

24. The method of claim 22, wherein identifying the intent comprises using a validation rule in which the intent only includes one verb, one concept, or a plurality of concepts, and where concept occurrences including concept ordering and word cases are ignored from the identifying process.

25. The method of claim 22, further comprising where the intent is posted to the user interface, on behalf of the user, by the user companion system.

26. The method of claim 22, wherein the intent includes actionable insights that include sign language interpretation of the intent.

* * * * *

UNITED STATES PATENT AND TRADEMARK OFFICE
CERTIFICATE OF CORRECTION

| | | |
|---|---|---|
| PATENT NO. | : 12,367,790 B2 | Page 1 of 1 |
| APPLICATION NO. | : 17/986890 | |
| DATED | : July 22, 2025 | |
| INVENTOR(S) | : Paulos James Nyirenda | |

It is certified that error appears in the above-identified patent and that said Letters Patent is hereby corrected as shown below:

In the Specification

In Column 10, Line 39, the text "PUP" should be replaced with the text –PHP–

In the Claims

Column 39, Claim 14, Line 9, should read:
--...been found to match the input data; and...--

Column 39, Claim 14, Line 11, should read:
--...altered words in the input data to replace a word or...--

Signed and Sealed this
Thirtieth Day of September, 2025

John A. Squires
*Director of the United States Patent and Trademark Office*